(12) United States Patent
Ellenbogen et al.

(10) Patent No.: US 11,841,520 B2
(45) Date of Patent: Dec. 12, 2023

(54) MULTILAYER OPTICAL ELEMENT FOR CONTROLLING LIGHT

(71) Applicants: Technology Innovation Momentum Fund (Israel) Limited Partnership, Tel-Aviv (IL); Yeda Research and Development Co. Ltd., Rehovot (IL)

(72) Inventors: Tal Ellenbogen, Tel-Aviv (IL); Yehiam Prior, Rehovot (IL); Ori Avayu, Tel Aviv (IL); Euclides Almeida, Rehovot (IL)

(73) Assignees: Technology Innovation Momentum Fund (Israel) Limited Partnership, Tel-Aviv (IL); Yeda Research and Development Co. Ltd., Rehovot (IL)

( * ) Notice: Subject to any disclaimer, the term of this patent is extended or adjusted under 35 U.S.C. 154(b) by 527 days.

(21) Appl. No.: 16/482,717

(22) PCT Filed: Feb. 2, 2018

(86) PCT No.: PCT/IB2018/050668
§ 371 (c)(1),
(2) Date: Aug. 1, 2019

(87) PCT Pub. No.: WO2018/142339
PCT Pub. Date: Aug. 9, 2018

(65) Prior Publication Data
US 2020/0284960 A1 Sep. 10, 2020

Related U.S. Application Data

(60) Provisional application No. 62/453,652, filed on Feb. 2, 2017.

(51) Int. Cl.
*G02B 5/28* (2006.01)
*G02B 5/00* (2006.01)

(52) U.S. Cl.
CPC ............ *G02B 5/288* (2013.01); *G02B 5/008* (2013.01); *G02B 2207/101* (2013.01)

(58) Field of Classification Search
CPC .......... G02B 1/002; G02B 5/008; G02B 5/20; G02B 5/204; G02B 2207/101; G02B 5/288; B82Y 20/00
See application file for complete search history.

(56) References Cited

U.S. PATENT DOCUMENTS 3,992,574 A * 11/1976 Bouwhuis ............ G11B 7/0917
369/44.23
10,310,287 B2 6/2019 Ellenbogen et al.
(Continued)

FOREIGN PATENT DOCUMENTS

EP 1128197 8/2001
JP 2006-350232 12/2006
(Continued)

OTHER PUBLICATIONS

Official Action dated Mar. 9, 2021 From U.S. Appl. No. 16/406,045. (17 Pages).
(Continued)

*Primary Examiner* — Jonathan Y Jung

(57) ABSTRACT

A multilayer optical element comprises a plurality of layers arranged along an optical axis, each layer having a plurality of nanostructures, wherein a size of—, and a spacing between—, the nanostructures is selected to provide a resonant response to an optical field at different wavelengths for different layers.

29 Claims, 15 Drawing Sheets
(13 of 15 Drawing Sheet(s) Filed in Color)

(56) References Cited

U.S. PATENT DOCUMENTS

| | | | |
|---|---|---|---|
| 10,485,445 B2 | 11/2019 | Palikaras et al. | |
| 11,137,617 B2 | 10/2021 | Ellenbogen et al. | |
| 2005/0073744 A1 | 4/2005 | Zheludev et al. | |
| 2007/0014006 A1 | 1/2007 | Tanaka et al. | |
| 2008/0088524 A1 | 4/2008 | Wang et al. | |
| 2008/0089645 A1 | 4/2008 | Wang et al. | |
| 2008/0198453 A1 | 8/2008 | LaFontaine et al. | |
| 2009/0296236 A1 | 12/2009 | Bowers et al. | |
| 2010/0053608 A1* | 3/2010 | Lee | G01L 1/247 356/326 |
| 2010/0054105 A1 | 3/2010 | Handa | |
| 2010/0141358 A1 | 6/2010 | Akyurtlu et al. | |
| 2010/0142014 A1* | 6/2010 | Rosen | G03H 1/0402 359/1 |
| 2012/0113502 A1 | 5/2012 | Suh et al. | |
| 2012/0267549 A1* | 10/2012 | Crozier | B01L 3/502715 250/432 R |
| 2013/0077049 A1 | 3/2013 | Bohn | |
| 2013/0208332 A1 | 8/2013 | Yu et al. | |
| 2013/0342898 A1 | 12/2013 | Alvinc et al. | |
| 2015/0380829 A1* | 12/2015 | Lee-Bouhours | H01Q 15/10 343/754 |
| 2016/0259175 A1* | 9/2016 | Ellenbogen | G02B 1/002 |
| 2016/0306079 A1* | 10/2016 | Arbabi | G02B 27/0025 |
| 2016/0353039 A1* | 12/2016 | Rephaeli | B82Y 20/00 |
| 2017/0003169 A1* | 1/2017 | Shaltout | G01N 21/19 |
| 2017/0131460 A1 | 5/2017 | Lin et al. | |
| 2017/0293141 A1 | 10/2017 | Schowengerdt et al. | |
| 2017/0310907 A1 | 10/2017 | Wang | |
| 2018/0217395 A1 | 8/2018 | Lin et al. | |
| 2018/0252857 A1 | 9/2018 | Glik et al. | |
| 2019/0265498 A1 | 8/2019 | Ellenbogen et al. | |
| 2021/0181515 A1 | 6/2021 | Ellenbogen et al. | |
| 2022/0026731 A1 | 1/2022 | Ellenbogen et al. | |

FOREIGN PATENT DOCUMENTS

| | | | |
|---|---|---|---|
| WO | WO 2005/057247 | 6/2005 | |
| WO | WO 2011/139785 | 11/2011 | |
| WO | WO 2013/033591 | 3/2013 | |
| WO | WO 2013/033591 | 5/2013 | |
| WO | WO 2015/063762 | 5/2015 | |
| WO | WO-2015063762 A1 * | 5/2015 | G02B 1/002 |
| WO | WO 2018/142339 | 8/2018 | |
| WO | WO 2020/065380 | 4/2020 | |

OTHER PUBLICATIONS

Communication Pursuant to Rule 164(1) EPC [Supplementary Partial European Search Report and the Provisional Opinion] dated Jun. 30, 2017 From the European Patent Office Re. Application No. 14857816.4. (12 Pages).
Corrected Supplementary European Search Report and the European Search Opinion dated Jan. 16, 2018 From the European Patent Office Re. Application No. 14857816.4. (12 Pages).
International Preliminary Report on Patentability dated May 12, 2016 From the International Bureau of WIPO Re. Application No. PCT/IL2014/050932.
International Preliminary Report on Patentability dated Aug. 15, 2019 From the International Bureau of WIPO Re. Application No. PCT/IB2018/050668. (7 Pages).
International Search Report and the Written Opinion dated May 3, 2018 From the International Searching Authority Re. Application No. PCT/IB2018/050668. (11 Pages).
International Search Report and the Written Opinion dated Feb. 17, 2015 From the International Searching Authority Re. Application No. PCT/IL2014/050932.
International Search Report and the Written Opinion dated Jan. 24, 2019 From the International Searching Authority Re. Application No. PCT/IB2018/057504. (14 Pages).
Official Action dated May 14, 2018 From U.S. Appl. No. 15/032,418. (19 pages).
Supplementary European Search Report and the European Search Opinion dated Sep. 11, 2017 From the European Patent Office Re. Application No. 14857816.4. (16 Pages).
Aieta et al. "Aberration-Free Ultrathin Flat Lenses and Axicons at Telecom Wavelengths Based on Plasmonic Metasurfaces", Nano Letters, 12: 4932-4936, Aug. 15, 2012.
Avayu et al. "Ultrathin Full Color Visor With Large Field of View Based on Multilayered Metasurface Design", Digital Optics for Immersive Displays, Proceedings of the SPIE, 1067612: 1067612-1-1067612-7, May 21, 2018.
Chen et al. "Dual-Polarity Plasmonic Metalens for Visible Light", Nature Communications, 3: 1198-1-1198-6, Nov. 13, 2012.
Ellenbogen et al. "Nonlinear Generation and Manipulation of Airy Beams", Nature Photonics, 3: 395-398, Jul. 2009.
Fu et al. "Experimental Investigation of Superfocusing of Plasmonic Lens With Chirped Circular Nanoslits", Optics Express, 18(4): 3438-3443, Feb. 15, 2010.
Giannini et al. "Plasmonic Nanoantennas: Fundamentals and Their Use in Controlling the Radiative Properties of Nanoemitters", Chemical Reviews, 111(6): 3888-3912, Mar. 24, 2011.
Lin et al. "Polarization-Controlled Tunable Directional Coupling of Surface Plasmon Polaritons", Science 340: 331-334, Apr. 19, 2013.
Liu et al. "Three-Dimensional Photonic Metamaterials at Optical Frequencies", Nature Materials, 7(1): 31-37, Published Online Dec. 2, 2007.
Siviloglou et al. "Accelerating Finite Energy Airy Beams", Optics Letters, 32(8): 979-981, Apr. 15, 2007.
Wan et al. "Control the Dispersive Properties of Compound Plasmonic Lenses", Optics Communicationa, XP055384689, 291: 390-394, Available Online Dec. 5, 2012. Section 3, Figs.1-4.
Young "Zone Plates and Their Aberrations", Journal of the Optical Society of America, 62(8): 972-976, Aug. 1972.
Zhao et al. "A Reconfigurable Plasmofluidic Lens", Nature Communications, 4(2305): 1-8, Aug. 9, 2013.
Official Action dated Jun. 8, 2023 from U.S. Appl. No. 17/492,765. (22 pages).
Grounds of Reason of Rejection dated Jul. 17, 2023 From the Korean Intellectual Property Office Re. Application No. 10-2021-7011443 and Its Translation Into English. (15 Pages).
Official Action dated Jul. 21, 2023 from U.S. Appl. No. 17/268,468. (22 pages).

* cited by examiner

FIG. 3A
FIG. 3B
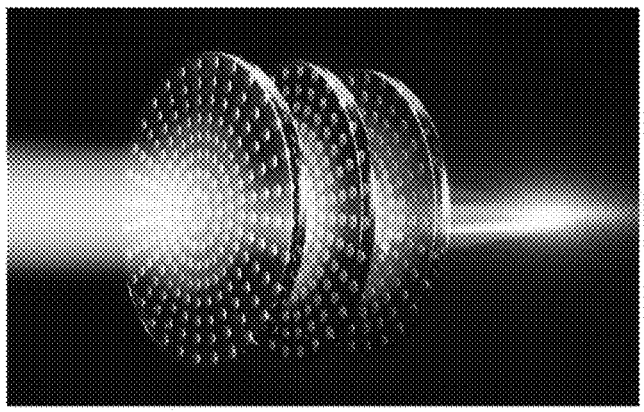
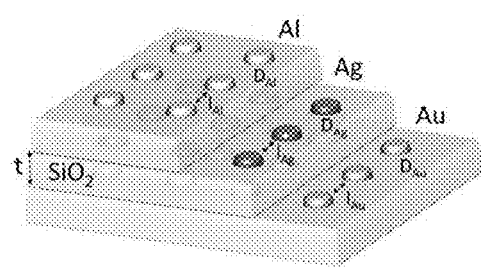
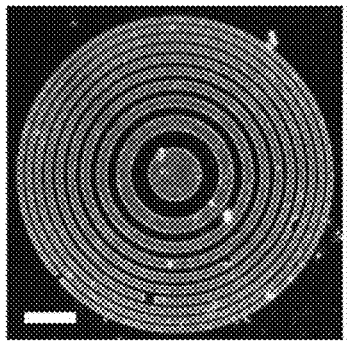
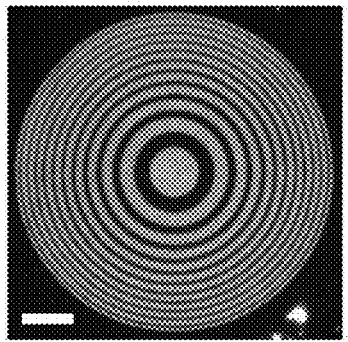
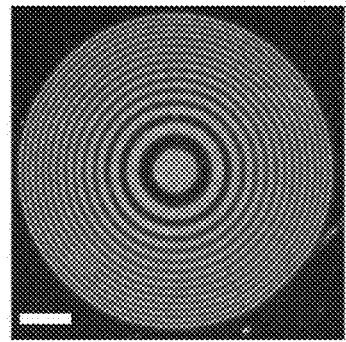
FIG. 3C
FIG. 3D
FIG. 3E FIG. 5A
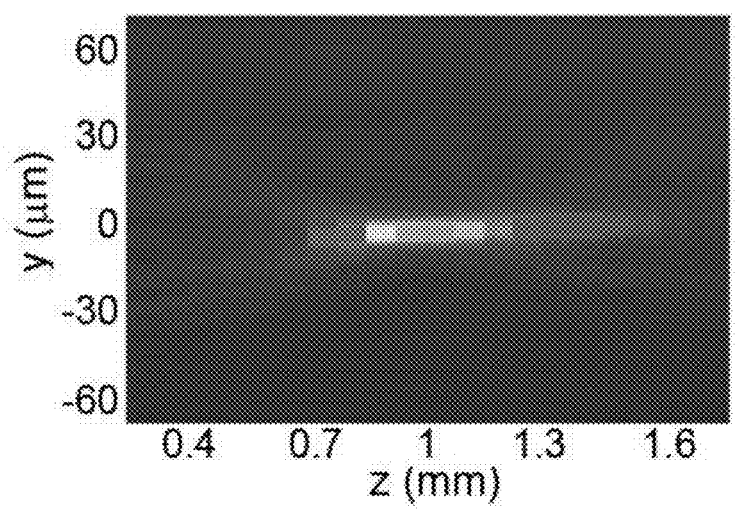
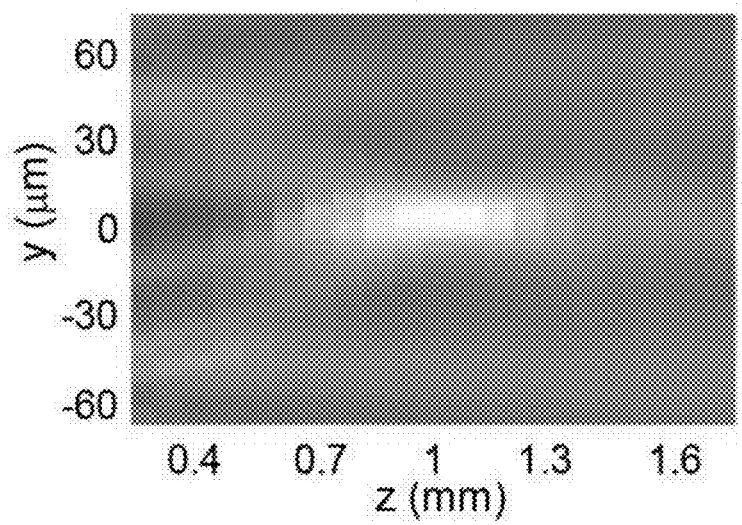
FIG. 5B

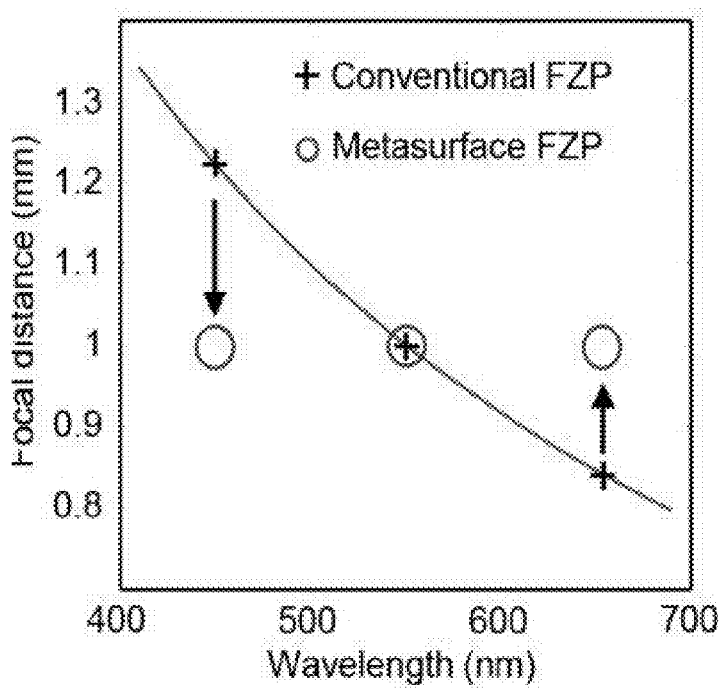
FIG. 5I
FIG. 6A
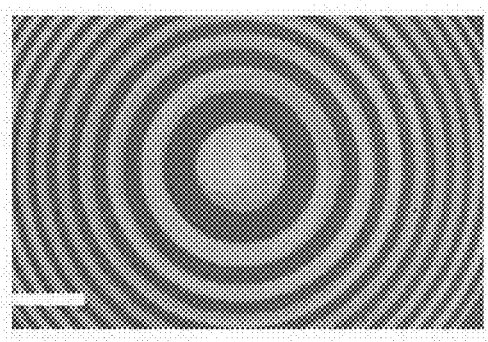
FIG. 6B
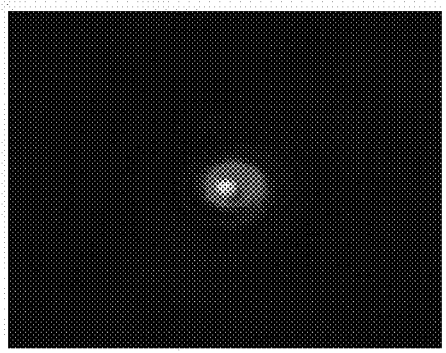
FIG. 6C
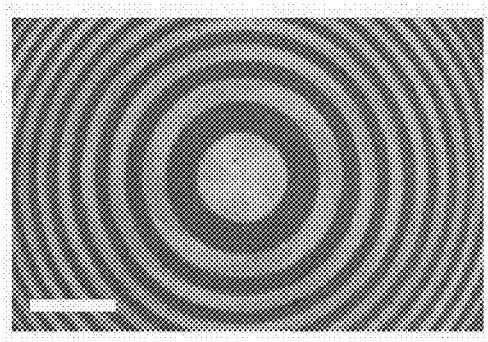
FIG. 6D
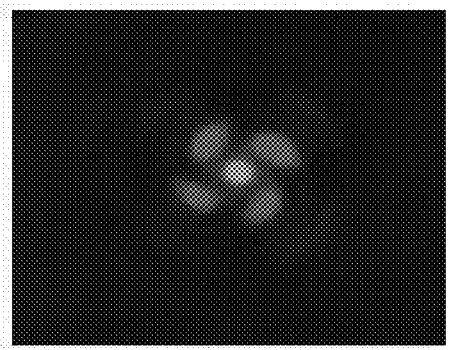

MULTILAYER OPTICAL ELEMENT FOR CONTROLLING LIGHT

RELATED APPLICATIONS

This application is a National Phase of PCT Patent Application No. PCT/IB2018/050668 having International filing date of Feb. 2, 2018, which claims the benefit of priority of U.S. Provisional Patent Application No. 62/453,652 filed on Feb. 2, 2017. The contents of the above applications are all incorporated by reference as if fully set forth herein in their entirety.

FIELD AND BACKGROUND OF THE INVENTION

The present invention, in some embodiments thereof, relates to optics and, more particularly, but not exclusively, to a multilayer optical element for controlling light.

A light wavefront can be shaped by optical components, such as lenses and prisms, as well as diffractive elements, such as gratings and holograms, relying on gradual phase changes accumulated along the optical path.

Known in the art is the use of flat optical components which exploit the wave diffraction phenomenon and create engineered diffractive optical elements made out of amplitude and phase plates. Recently there were some demonstrations of control and diversion of light field by using metasurfaces.

Aieta, et al., Nano Letters 12, 4932 (2012), apply optical phase discontinuities to the design of a phased array of ultrathin subwavelength-spaced optical antennas. V-shaped nanoantennas introduce a radial distribution of phase discontinuities, thereby generating respectively spherical wavefronts and non-diffracting Bessel beams at telecom wavelengths.

Chen et al., Nature Communications 3, 1198 (2012), teach a dual-polarity flat lens based on helicity-dependent phase discontinuities for circularly polarized light. By controlling the helicity of the input light, the positive and negative polarities are interchangeable in one identical flat lens. Helicity controllable real and virtual focal planes, as well as magnified and demagnified imaging, are observed on the same plasmonic lens at visible and near-infrared wavelengths.

Fu et al., Optics Express 18, 3438 (2010), teach a plasmonic lens with metallic chirped circular nanoslits corrugated on Au film supported on quartz substrate for the purpose of super-focusing. An improved focusing performance in comparison to that of the non-chirped lens is reported.

Ellenbogen et al., Nano Letters 12, 1026 (2012), teach nonlinear generation of Airy beams using wave mixing processes, which occur in asymmetric nonlinear photonic crystals.

International Patent Application, Publication No. WO2015/063762, the contents of which are hereby incorporated by reference, discloses different FZP lenses positioned serially on the same optical axis, wherein each FZP lens comprises along its rings elongated nanostructures selected to provide a resonant response to a different wavelength.

SUMMARY OF THE INVENTION

According to an aspect of some embodiments of the invention there is provided a multilayer optical element. The multilayer optical element comprises a plurality of layers arranged along an optical axis, each layer having a plurality of nanostructures, wherein a size of—and a spacing between—the nanostructures is selected to provide a resonant response to an optical field at a different wavelength, and wherein a distance between the layers is selected to induce destructive or instructive interference of optical field components within a spectral crosstalk among the resonant responses.

According to an aspect of some embodiments of the present invention there is provided a method of fabricating multilayer optical element. The method comprises: forming on a substrate a plurality of nanostructures, wherein a size of—and a spacing between—the nanostructures is selected to provide a resonant response to an optical field at a predetermined wavelength, thereby providing a first layer; growing an additional substrate on the first layer; and repeating the formation of nanostructures on the additional substrate for a different predetermined wavelength, thereby providing a second layer; wherein a distance between the layers is selected to induce destructive or instructive interference of optical field components within a spectral crosstalk among the resonant responses.

According to some embodiments of the invention method comprises repeating the growing and the formation at least once, to form at least one additional layer.

According to an aspect of some embodiments of the present invention there is provided an optical system, comprising a reflective element and the optical element as delineated above and optionally and preferably as detailed below.

According to an aspect of some embodiments of the present invention there is provided an optical system, comprising a partially reflective partially transmissive element and the optical element as delineated above and optionally, and preferably as detailed below, placed in front of the partially reflective side of the partially reflective partially transmissive element.

According to an aspect of some embodiments of the present invention there is provided an optical system. The system comprises: a multilayer optical element having a plurality of layers arranged along an optical axis, each layer having a plurality of nanostructures, wherein a size of—and a spacing between—the nanostructures is selected to provide a resonant response to an optical field at a different wavelength; and a non-resonant optical element; wherein a distance between each of the layers and the non-resonant optical element is about an integer multiplication of a quarter wavelength of a respective wavelength for which the layer provides the resonant response.

According to an aspect of some embodiments of the present invention there is provided a method of shaping a light beam, comprising passing the light beam through the system as delineated above and optionally and preferably as detailed below.

According to some embodiments of the invention for each layer, a standard deviation of a size of the nanostructures is less than 20% of an average size of the nanostructures.

According to some embodiments of the invention each layer comprises nanostructures made of a different metal.

According to some embodiments of the invention the plurality of layers comprises a first layer having gold nanostructures sized and spaced apart to provide a resonant response to an optical field at a first wavelength, a second layer having silver nanostructures sized and spaced apart to provide a resonant response to an optical field at a second wavelength being shorter than the first wavelength, and a third layer having aluminum nanostructures sized and spaced apart to provide a resonant response to an optical field at a third wavelength being shorter than the second wavelength.

According to some embodiments of the invention, for each layer the nanostructures are arranged to form a zone plate.

According to some embodiments of the invention, the nanostructures of the layers are arranged to focus the different wavelengths onto the same focal plane.

According to some embodiments of the invention, nanostructures of one of the layers are arranged to focus a respective wavelength to a spot at a focal plane, and nanostructures of another one of the layers are arranged to focus a respective wavelength to an annulus surrounding the spot at the focal plane.

According to some embodiments of the invention, the plurality of layers comprises two or more pairs of layers, wherein for each pair of layers, a size of—and a spacing between—nanostructures of both layers in the pair is selected to provide a resonant response to an optical field at the same wavelength.

According to an aspect of some embodiments of the present invention there is provided an imaging system, comprising the system as delineated above and optionally and preferably as detailed below.

According to an aspect of some embodiments of the present invention there is provided an optical reader, comprising the system as delineated above and optionally and preferably as detailed below.

According to an aspect of some embodiments of the present invention there is provided an optical communication system, comprising the system as delineated above and optionally and preferably as detailed below.

According to an aspect of some embodiments of the present invention there is provided an opto-electronic system, comprising the system as delineated above and optionally and preferably as detailed below.

According to an aspect of some embodiments of the present invention there is provided an integrated optical circuit, comprising the system as delineated above and optionally and preferably as detailed below.

According to an aspect of some embodiments of the present invention there is provided a microscopy system, comprising the system as delineated above and optionally and preferably as detailed below.

According to an aspect of some embodiments of the present invention there is provided a virtual reality system, comprising the system as delineated above and optionally and preferably as detailed below.

According to an aspect of some embodiments of the present invention there is provided an augmented reality system, comprising the system as delineated above and optionally and preferably as detailed below.

According to an aspect of some embodiments of the present invention there is provided a method, comprising passing a light beam through the system as delineated above and optionally and preferably as detailed below to form a hologram.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1A:
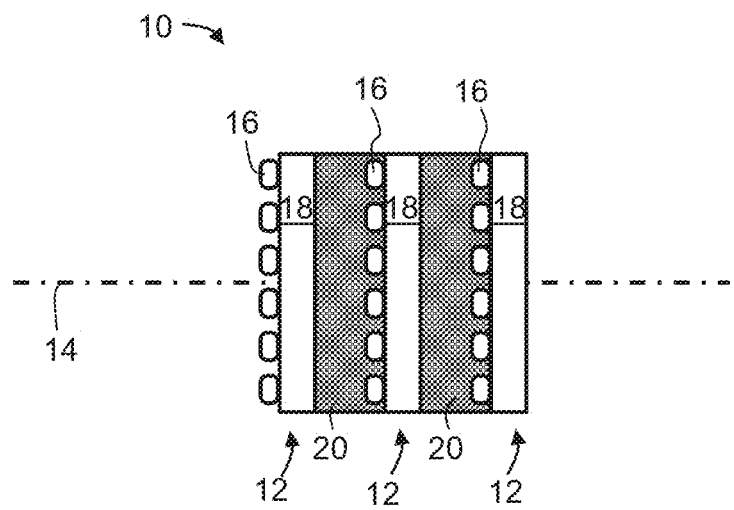
Figure 1B:
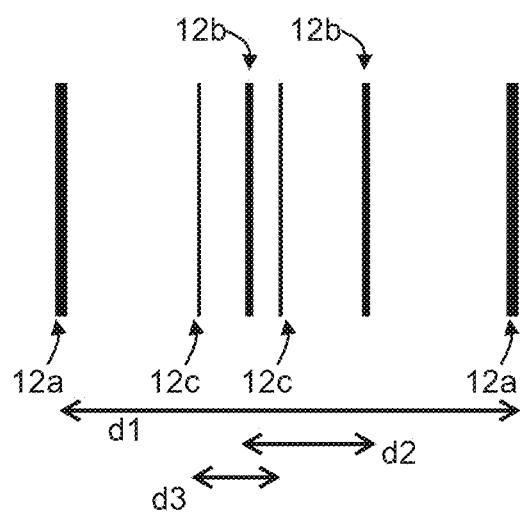
Figure 2A:
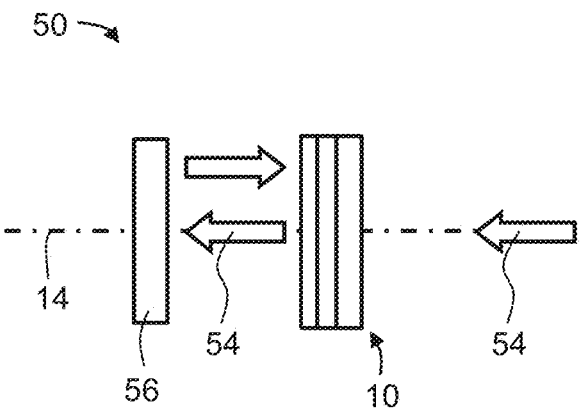
Figure 2B:
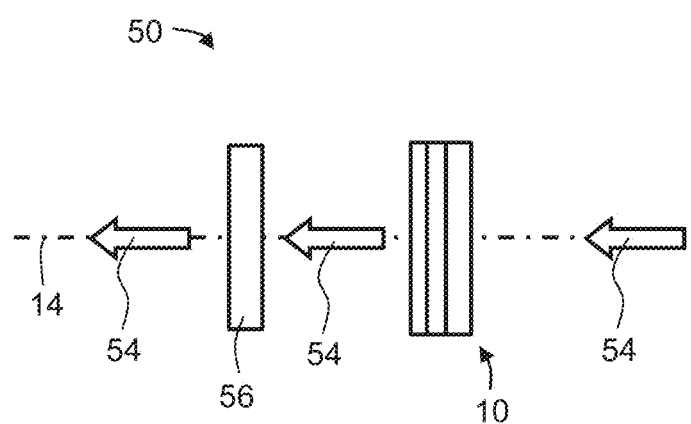

FIGS. 1A-B are schematic illustrations of a multilayer optical element, according to some embodiments of the present invention;

FIGS. 2A-B are schematic illustrations showing a side view of an optical system, according to some embodiments of the present invention.

Figures 7A, 7B, 7C:
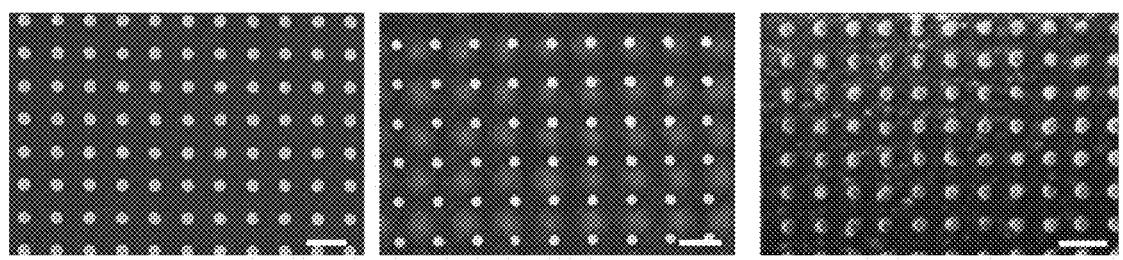
Figure 8:
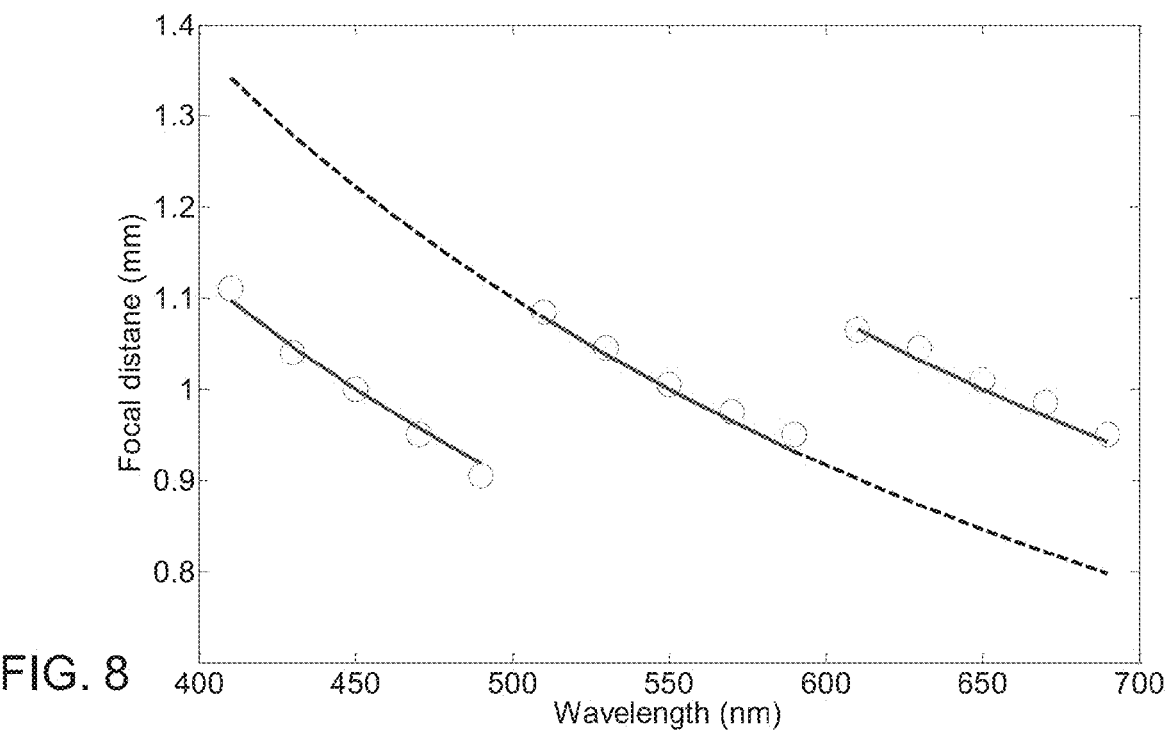
Figure 9:
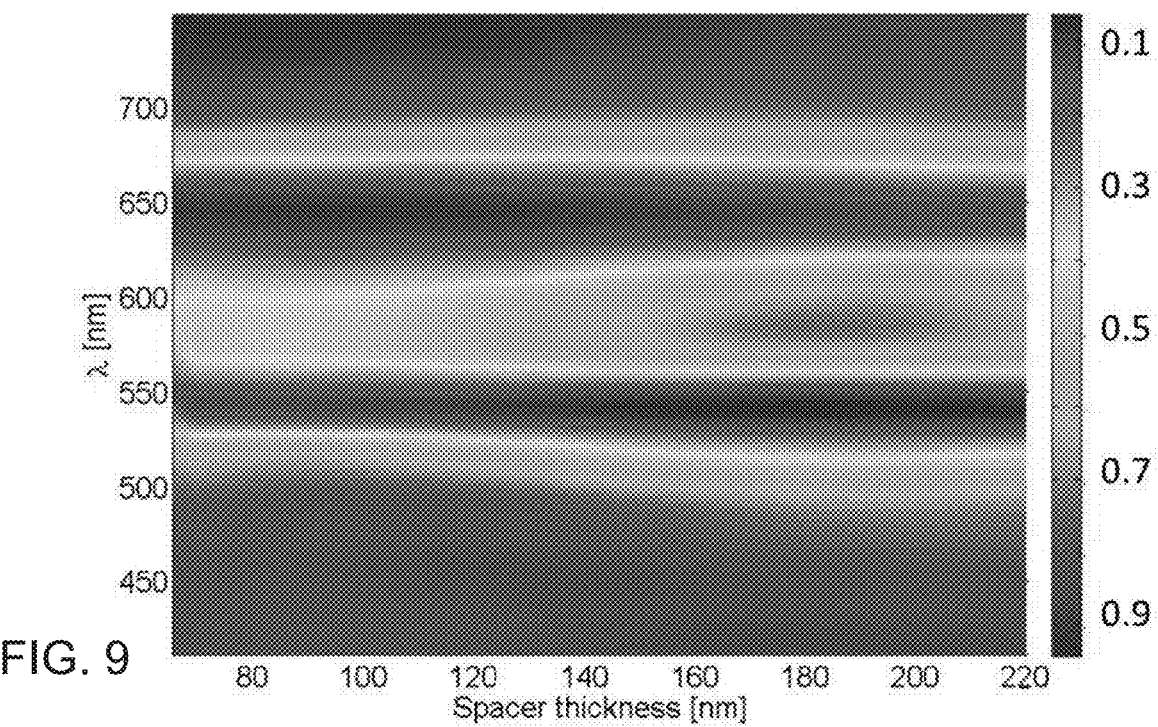
Figure 10A:
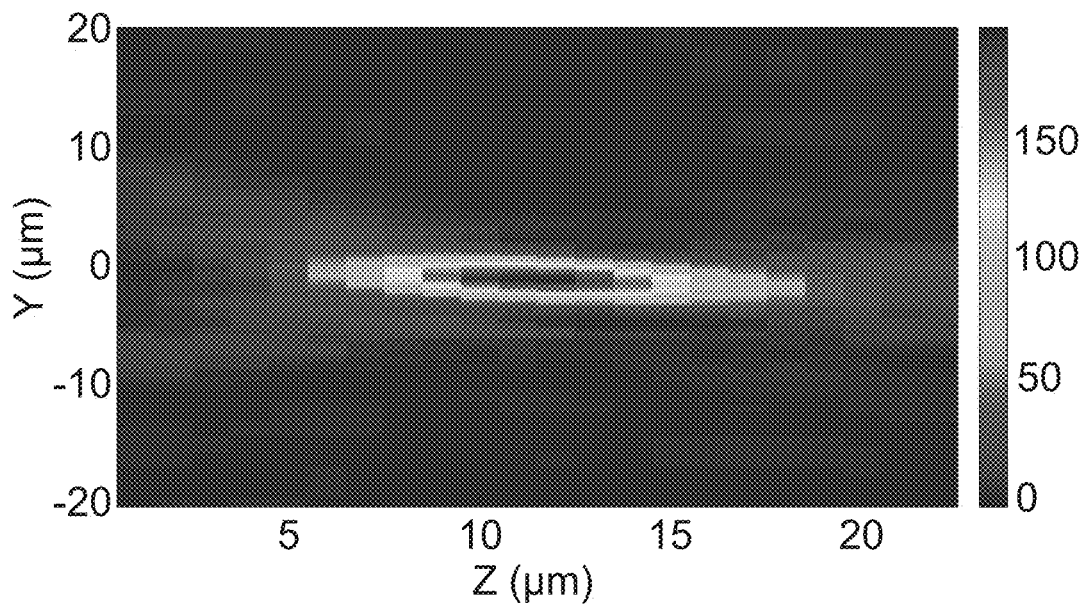
Figure 10B:
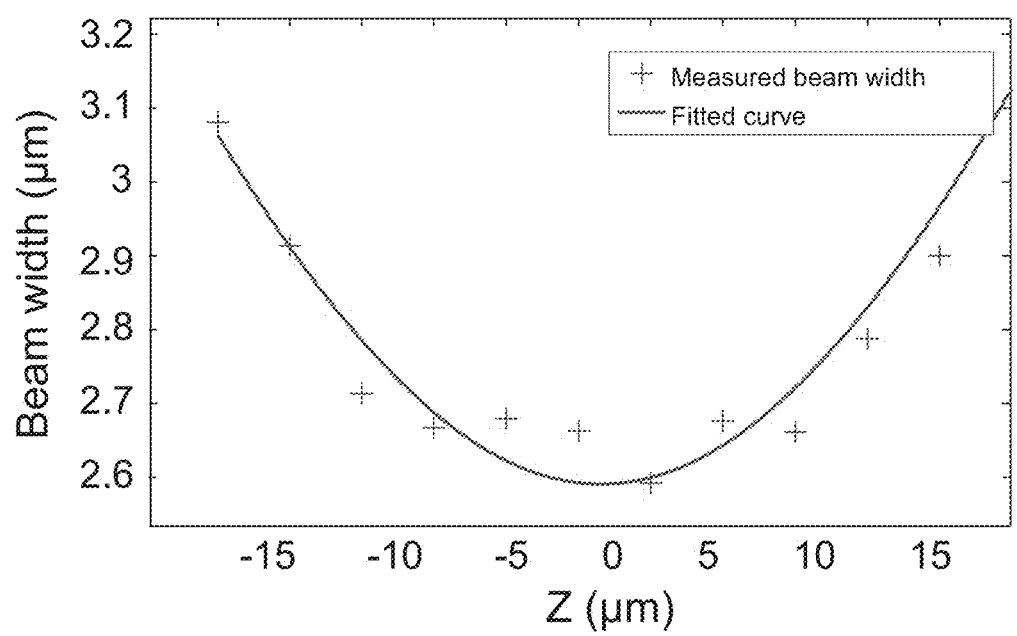
Figure 11A:
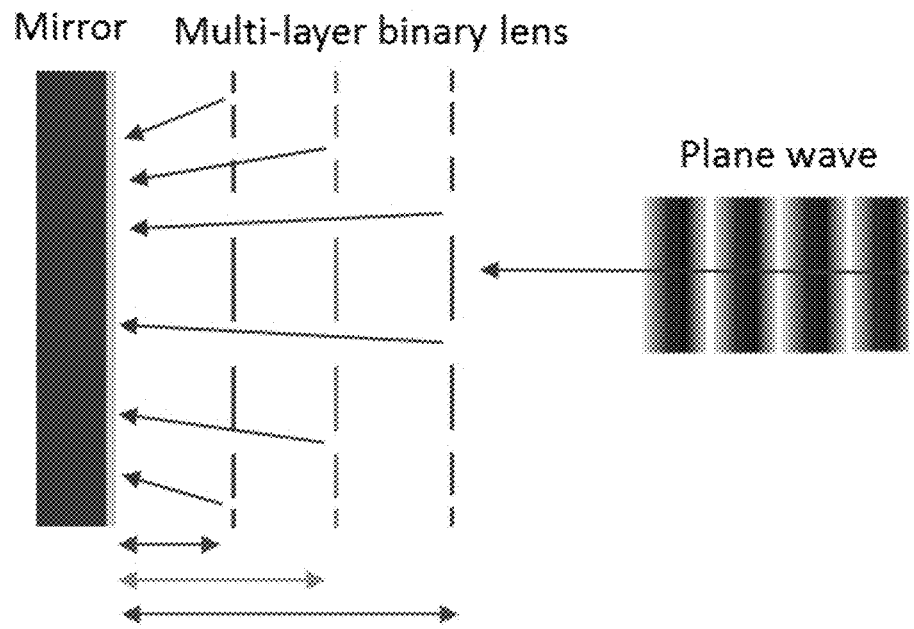
Figure 11B:
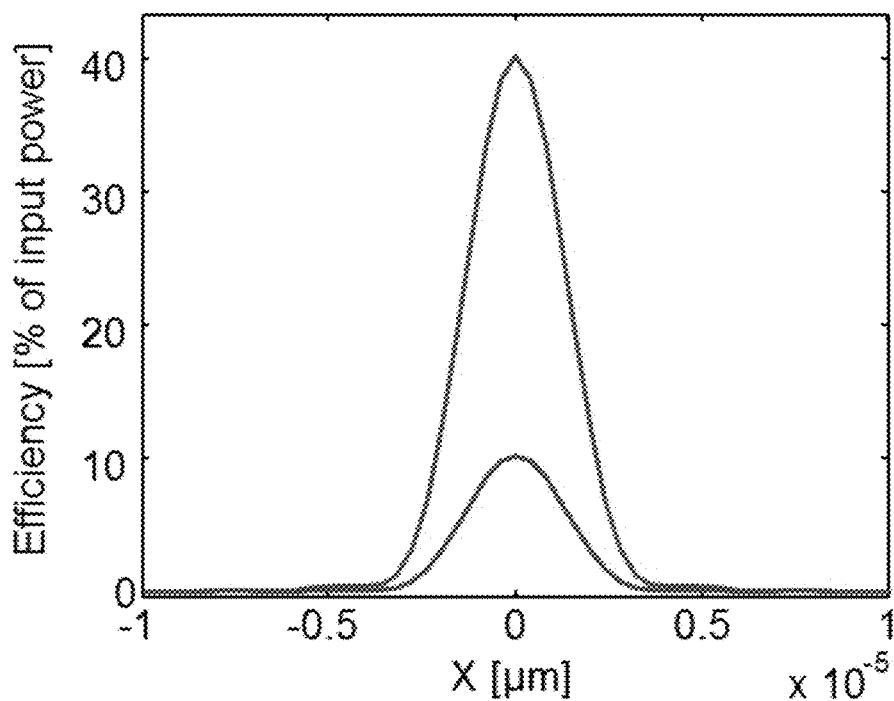
Figure 12A:
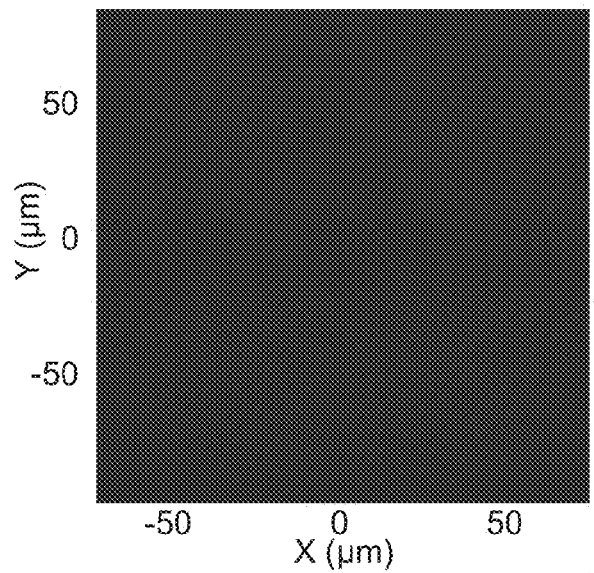
Figure 12B:
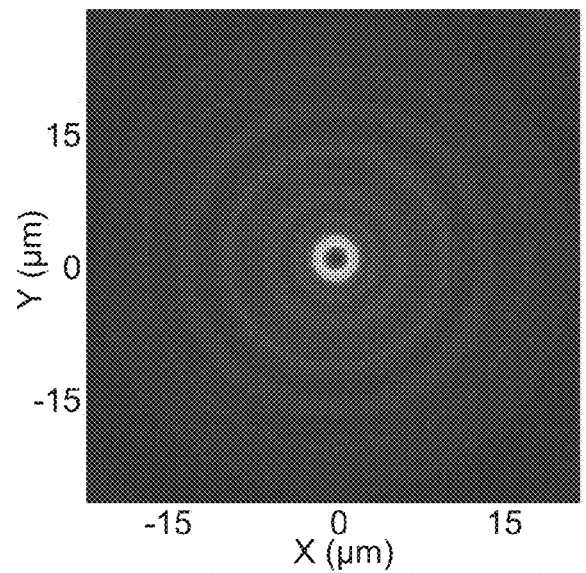
Figure 12C:
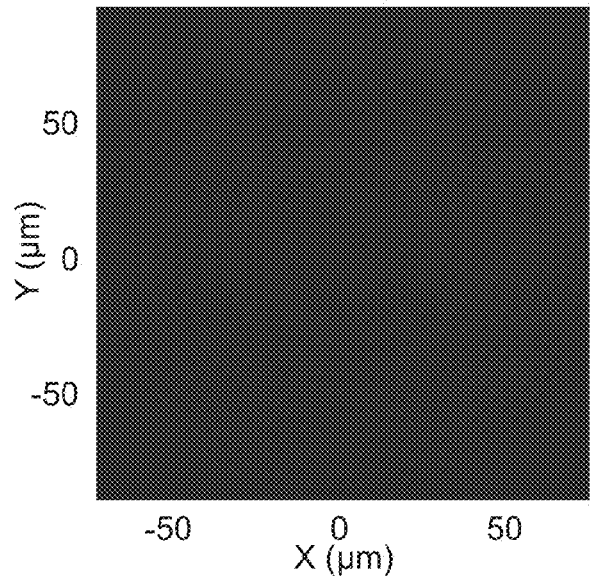
Figure 12D:
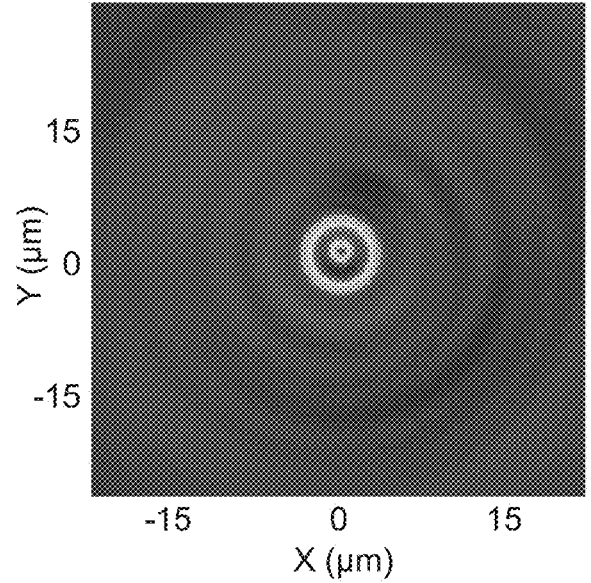
Figure 13A:
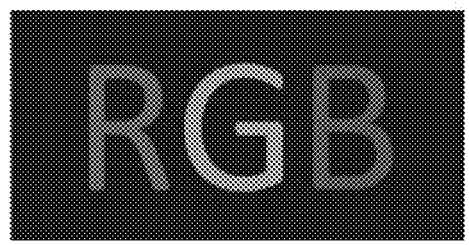
Figure 13B:
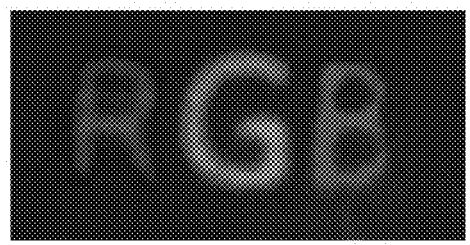

FIGS. 3A-G depict a three layer lens, used in experiments performed according to some embodiments of the present invention;

FIGS. 4A-E show focusing lens beam characterization with laser illumination, as obtained in experiments performed according to some embodiments of the present invention;

FIGS. 5A-I show chromatically corrected three layer metasurface lens, used in experiments performed according to some embodiments of the present invention;

FIGS. 6A-E show results obtained for complex lenses in experiments performed according to some embodiments of the present invention;

FIGS. 7A-C shows scanning electron microscope (SEM) images of sections of the multi-layer lens prepared in experiments performed according to some embodiments of the present invention;

FIG. 8 shows focal spots across visible spectrum, as obtained in experiments performed according to various exemplary embodiments of the present invention;

FIG. 9 shows an effect of spacer thickness on a resonance properties of gold and silver metasurface layers, as obtained in experiments performed according to some embodiments of the present invention;

FIGS. 10A and 10B show measured focused beam for a red beam at 650 nm, as obtained in experiments performed according to some embodiments of the present invention;

FIG. 11A is a schematic illustration of a 3 layer metasurface zone plate, according to some embodiments of the present invention;

FIG. 11B shows cross section of the focal plane intensity, 1 mm along the z direction, of a conventional zone plate, and the metasurface zone plate of FIG. 11A;

FIGS. 12A-D show simulated zone plates and optical field at a focal point; and FIGS. 13A and 13B show projected image and an image formed on a CCD, as obtained in experiments performed according to some embodiments of the present invention.

DESCRIPTION OF SPECIFIC EMBODIMENTS OF THE INVENTION

The present invention, in some embodiments thereof, relates to optics and, more particularly, but not exclusively, to a multilayer optical element for controlling light.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

For the purpose of providing a complete and self-contained description of some embodiments of the invention, an introductory explanation of the principles of the diffraction theory will be provided.

Diffraction is a phenomenon which occurs when a wave encounters a small obstacle or small opening. Similar effects occur when a light wave travels through a medium with a varying refractive index. Diffraction occurs with all waves, including sound waves, water waves, and electromagnetic waves such as visible light, X-rays and radio waves.

When light illuminates a small slit or aperture, the light that passes through the slits diffracts to a series of spherical waves. These spherical waves form a diffraction pattern.

A linear diffraction grating is an optical element that includes several slits, through which diffraction occurs. A linear diffraction grating is characterized by a so-called grating period or grating pitch, d, which is directly related to the wavelength, $\lambda$, and to the angle $\theta$ at which a ray of the light is diffracted. The relation is given by:

$$d \sin \theta = m\lambda \qquad \text{EQ. 3}$$

A Fresnel zone plate (FZP), is an optical element which includes zones in the form of concentric rings. The width of each zone is selected to focus the light to a focal point, P, located at the other side of the optical element. The average distance of successive zones from the focal point typically differs by $\lambda/2$. The radius $R_n$ of the nth ring of the plate can be calculated according to the following equation:

$$R_n^2 = \left(r_0 + n\frac{\lambda}{2}\right)^2 - r_0^2 = r_0^2\left[n\frac{\lambda}{r_0} + \frac{n^2}{4}\left(\frac{\lambda}{r_0}\right)^2\right], \qquad \text{EQ. 4}$$

where $r_0$ is the distance from the center of the plate to the focal point. When $r_0$ is much longer than the wavelength $\lambda$ (e.g., $r_0 > 10\lambda$), the expression of $R_n$ simplifies to:

$$R_n \approx \sqrt{nr_0\lambda}. \qquad \text{EQ. 5}$$

A maximal light intensity at the focal point can be obtained by blocking all even rings $R_2, R_4, \ldots$.

It was found by the present inventors that while conventional techniques can divert and control light, they suffer from large chromatic aberrations. The present inventors have devised a multilayer optical element that control light in a wavelength selective manner. It was found by the present inventors that an optical system employing the multilayer optical element of the present embodiments can correct the chromatic aberrations which are inherent in conventional diffractive optical elements and, in some embodiments, be used to create hyper and multispectral optical elements.

The multilayer optical element exploits nanoscale physical phenomena to control light, and is advantageous over traditional flat optics technologies which are bulky and/or expensive. The multilayer optical element of the present embodiments can be used in many applications.

In some embodiments of the present invention, the multilayer optical element controls the shape of optical beams. The shape is optionally and preferably controlled wherein different spectral bands of light are shaped independently.

A bundle of rays of light irradiated upon the optical element(s) of the present embodiments is modified in a defined way with respect to its beam parameters. These embodiments are useful, for example, in practical applications in which it is required that a bundle of rays forming a light beam has a defined geometric shape with respect to its cross section, e.g., a circular, annular, rectangular or lattice-like shape or the like, and an intensity profile defined across its cross section. Some embodiments of the invention allow both properties to be controlled simultaneously. For example if the light source delivering the incoming bundle of rays supplies a bundle of rays with a particular intensity distribution and a particular geometric dimensions, but defined specifications of some application require a bundle of rays with another intensity distribution and/or other geometric dimensions, the optical elements of the present embodiments can be used to reshape the bundle of rays.

The beam shaping of the present embodiments can be employed in many practical applications. One example is laser applications, in which it is desired to control the shape of the laser beam for the desired use. The laser output beam quality and shape determine the quality, quantity and efficiency of, for example, work piece machining. Another example is the area of communication whereby optical signals are transmitted between various optical components. A conventional light-emitting module incorporated in an optical communications system generally includes a light source (e.g., a laser diode), an optical fiber and a lens interposed between the light source and optical fiber for converging the light beam onto the core of the optical fiber. It is recognized that the communication efficiency depends on the ability of the lens to provide the optical signal passing with the proper intensity profile so as to reduce coupling losses. The optical elements of the present embodiments can provide the beam with an intensity profile that improves the communication efficiency. An additional example is optical scanning. Optical scanners, such as bar code scanners, typically make use of light from laser diodes which are moved to provide the scanning beam. Such diodes are robust and relatively inexpensive, but the beam emerging from a laser diode is typically astigmatic. When a bar code symbol is to be scanned it is generally desirable for the beam width to be relatively small at the point at which it impinges upon the bar code symbol, to provide proper discrimination between the bars and spaces. On the other hand, it is desirable to have the perpendicular dimension relatively large to minimize noise. The optical element of the present embodiments can control the intensity profile of such optical scanners to allow noise free reading with minimal astigmatism.

Additional practical applications include optical imaging, mobile devices, holograms, virtual reality, augmented reality, microscopy, e.g., STimulated Emission Depletion (STED) microscopy, projectors, 3D projectors, multiwavelength absorbers, multiwavelength light trapping, e.g., for solar cell devices, and the like.

Referring now to the drawings, FIG. 1A is a schematic illustration of a multilayer optical element 10, according to some embodiments of the present invention. Element 10 optionally and preferably comprises a plurality of layers 12a, 12b, 12c. FIG. 1A shows three layers, but element 10 can include any number of layers, preferably at least two layers. Layers 12 are preferably stacked along an optical axis 14. Each of layers 12 optionally and preferably has a plurality of nanostructures 16. Typically, the nanostructures of each layer are formed on, or embedded in, a respective substrate 18 that is optionally and preferably transmissive to an optical field for which element 10 is designed. For example, when element 10 is designed for visible light (e.g., wavelength from about 400 nm to about 725 nm), substrate 18 is transmissive (e.g., with transmission coefficient of at least 80%) to visible light. Representative examples of materials suitable for use as substrate 18 include, without limitation, at least one of: glass, Indium-Tin-Oxide (ITO), silica, and the like. In some embodiments of the present invention the substrate is by itself a layered substrate, e.g., an ITO coated glass. The nanostructures can be formed on, or embedded in, substrate 18 using any technique known in the art including, without limitation, deposition, printing, etching lithography and the like. Alternatively, substrate 18 can be made reflective.

Nanostructures 16 can have any shape, such as, but not limited to, rounded shape (e.g., a disk or an oval, e.g., an oval having an aspect ratio of less than 2), a cross, a polygon (e.g., triangle, rectangle), an elongated shape, and the like. One or more of the nanostructure 16 can also be composed of several elements (e.g., a cross made of two elongated nanostructures).

The term "nanostructure" generally refers to a three-dimensional body made of a solid substance, in which its largest dimension is at less than 1 μm and more than 1 nm. In some exemplary embodiments of the invention the largest dimension of the nanostructure 16 (e.g., the diameter or major axis) is from about 30 nm to about 800 nm. Representative examples of materials suitable for use as the elongated nanostructures of the present embodiments include, without limitation, metal, e.g., gold, silver, aluminum, chromium and platinum.

The term "elongated nanostructure" generally refers to a three-dimensional body made of a solid substance, in which one of its dimensions is at least 2 times, or at least 10 times, or at least 50 times e.g., at least 100 times larger than any of the other two dimensions. The largest dimension of the elongated solid structure is referred to herein as the longitudinal dimension or the length of the nanostructure, and the other two dimensions are referred to herein as the transverse dimensions. The largest of the transverse dimensions is referred to herein as the diameter or width of the elongated nanostructure. The ratio between the length and the width of the nanostructure is known as the aspect ratio of the nanostructure.

In various exemplary embodiments of the invention the length of the elongated nanostructure is at least 50 nm, or at least 100 nm, or at least 500 nm, or at least 1 μm, or at least 2 μm, or at least 3 μm, e.g., about 4 μm, or more. The width of the elongated nanostructure is preferably less than 1 μm. In various exemplary embodiments of the invention the width of the nanostructure is from about 30 nm to about 200 nm.

In some embodiments of the present invention the size of the nanostructures in each layer, and the spacing between the nanostructures in each layer is selected to provide a resonant response to an optical field at a different wavelength.

As used herein, "resonance response" refers to a situation at which the interaction amplitude between the nanostructures and the optical field exhibits a maximum as a function of the frequency or wavelength of the optical field.

In various exemplary embodiments of the invention the resonant response is a plasmonic excitation.

While a specific layer provides a resonant response to an optical field at a specific wavelength, the interaction amplitude of optical field components of wavelengths that are close to the specific wavelength is also enhanced. The resonance response of a layer is therefore characterized by a range of wavelengths for which the interaction amplitude is enhanced relative to optical field components of wavelengths that are outside this range. The specific wavelength at which the interaction amplitude exhibits a maximum is referred to as the central wavelength of the layer.

In some embodiments of the present invention each of layers 12 comprises nanostructures made of a different metal. For example, element 10 can comprise a layer having only gold nanostructures, and/or a layer having only silver nanostructures and/or a layer having only aluminum nanostructures.

In some embodiments of the present invention one or more of the layers of element 10 comprises dielectric nanostructures, preferably but not necessarily nanostructures made of a dielectric material with index of refraction of at least 1.8. In some embodiments of the present invention one or more of the layers of element 10 comprises dielectric nanostructures and is devoid of metallic nanostructures, and in some embodiments of the present invention each of the layers of element 10 comprises dielectric nanostructures and is devoid of metallic nanostructures.

The size of the nanostructures in each layer is optionally and preferably uniform across the layer. In some embodiments of the present invention the standard deviation of a size of the rounded nanostructures of a given layer is less than 20% or less than 10% or less than 5% of the average size of the nanostructures (e.g., along the largest dimension) over the respective layer.

Typically, but not necessarily, the size of—, and the spacing between—, the nanostructures in each layer is selected to provide resonant response to visible light. For example, the nanostructures in one of the layers can be selected and arranged to provide resonant response to red light (e.g., from about 625 nm to about 725 nm), the nanostructures in another one of the layers can be selected and arranged to provide resonant response to green light (e.g., from about 500 nm to about 550 nm), and the nanostructures in an additional one of the layers can be selected and arranged to provide resonant response to blue light (e.g., from about 450 nm to about 500 nm).

Other configurations, for example, a two-layer configuration (e.g., a layer for red light and a layer for green light, or a layer for red light and a layer for blue light, or a layer for blue light and a layer for green light), or a four-layer configuration (e.g., a layer for red light, a layer for green light, a layer for blue light, and a layer for violet light, e.g., from about 400 nm to about 450 nm), are also contemplated. Further, one or more of the layers can include nanostructures selected and arranged to provide resonant response to non-visible (e.g., infrared, violet) light.

The present embodiments contemplate many geometrical distributions of the nanostructures 16 over the respective layer. Typically, the nanostructures are distributed in one or more patterns to form a zone plate, such as, but not limited to, a Fresnel Zone Plate (FZP). However, this need not necessarily be the case, since, for some applications, it may not be necessary for the nanostructures to be distributed in an ordered manner. For example, the nanostructures can be randomly distributed over the respective layer.

When the nanostructures are distributed in one or more patterns, the pattern(s) can be of any type, such as, but not limited to, pattern(s) that induce a phase gradient to the optical field interacting with the layer (e.g., a spiral pattern, see, e.g., FIG. 12C in the Examples section that follow), or pattern(s) that induce a binary phase change (e.g., a set of concentering rings, see, e.g., FIG. 12A in the Examples section that follow), or pattern(s) that induce a non-binary but discrete phase change. As a representative example, which is not to be considered as limiting, in some embodiments the nanostructures 16 are arranged to focus the different wavelengths onto the same focal plane, in which case the optical element can be used in an achromatic lens. As another representative example, which is not to be considered as limiting, in some embodiments the nanostructures 16 of one layer are arranged to focus a respective wavelength to a spot at a focal plane, and nanostructures of another layer are arranged to focus a respective wavelength to an annulus surrounding the spot at the focal plane. In these embodiments, the optical element can be used as a stimulation lens in STED microscopy. As an additional representative example, which is not to be considered as limiting, in some embodiments the nanostructures 16 of different layers are arranged to focus the respective wavelengths to different focal planes, such that shorter wavelengths are focused at shorter distances from element 10 than longer wavelengths. This is unlike conventional refractive-optics lenses which focus the shorter wavelengths at longer distances than the longer wavelengths. This can be used for various applications, such as, but not limited to, optical recording of data, or the creation of 3D holograms, or for virtual reality, or for augmented reality.

In some embodiments of the present invention a distance between the layers 12 is selected to reduce spectral crosstalk among the resonant responses.

The spectral crosstalk between two layers can be defined as the overlap between the curves that describe the interaction amplitude of a polychromatic optical field (e.g., white light) with the nanostructures of the layers.

When it is desired to reduce or prevent spectral crosstalk, the distance between the layers 12 and the resonance line shapes of the nanostructures in different layers is selected such that the amount of overlap between the curves is less than full-width-at-half-maximum, or less than full-width-at-third-maximum, or less than full-width-at-quarter-maximum, or less than full-width-at-fifth-maximum.

In experiments performed by the inventors it as found that cross talk can be reduced when the distance between the layers (e.g., between the surfaces of the substrates 18 that are occupied by the nanostructures) is from about 100 nm to about 300 nm, e.g., about 200 nm. The desired distance between the layers can be maintained, for example, by spacers 20 introduced or deposited between adjacent layers. The spacers are preferably transmissive to the optical field for which element 10 is designed. A representative example of materials suitable for use as spacers 20 include, without limitation, silica.

In alternative embodiments, the layers are designed to ensure a certain amount of spectral crosstalk between the resonant responses. These embodiments are particularly useful when it is desired to allow interaction between light components scattered off nanostructures of different layers. For example, spectral crosstalk can allow destructive or constructive interferences between the light components, hence also impose backward or forward propagation of the light along axis 14.

When it is desired to have spectral crosstalk, the distance between the layers 12 and the resonance line shapes of the nanostructures in different layers is selected such that the amount of overlap between the curves is at least full-width-at-half-maximum, or at least full-width-at-half-maximum but less than full-width-at-90%-maximum, or at least full-width-at-60%-maximum, or at least full-width-at-60%-maximum but less than full-width-at-90%-maximum, or at least full-width-at-70%-maximum, or at least full-width-at-70%-maximum but less than full-width-at-90%-maximum.

It is preferred that when there is a spectral crosstalk between layers the distance between these layers is integer multiplication of about quarter wavelength, or about half wavelength, or about full wavelength, of one of the light components within the curve overlap that characterizes the cross talk.

FIG. 1B is a schematic illustration of optical element 10 in embodiments in which element 10 comprises one or more pairs of layers wherein each layer is similar to the layers described above, except that for each pair of layers, the nanostructures of both layers in the pair are selected and arranged to provide resonant response to the same wavelength. For example, each pair of layers can include two identical layers. The substrates on which the nanostructures of the layers of a given pair are formed can be identical or different at desired. For example, for a given pair of layers, one substrate can be made reflective and the other substrate can be made transmissive. The advantage of the pair-wise configuration in FIG. 1B is that it allows controlling the transmission or reflection of each spectral band independently by interference effects.

Shown in FIG. 1B is a configuration with three pairs of layers, designated 12a, 12b and 12c. Both the layers of pair 12a can be constructed to provide resonant response to a first wavelength (e.g., red light), both the layers of pair 12b can be constructed to provide resonant response to a second wavelength (e.g., green light), and both the layers of pair 12c can be constructed to provide resonant response to a third wavelength (e.g., blue light). The distances between the layers of each pair (shown as d1, d2 and d3 in FIG. 1B) are optionally and preferably selected in accordance with the wavelength for which the respective pair is designed. For example, the distances can be integer multiplication of about quarter wavelength, or about half wavelength, or about full wavelength. The layers of different pairs can be interlaced or arranged serially, as desired.

FIGS. 2A-B are schematic illustrations showing a side view of an optical system 50, according to some embodiments of the present invention.

System 50 can be used for a variety of applications. For example, in some embodiments of the present invention system 50 is employed as a component of a lens system, in some embodiments of the present invention system 50 is employed as a component of an imaging system, in some embodiments of the present invention system 50 is employed as a component of an optical reader, in some embodiments of the present invention system 50 is employed as a component of an optical communication system, in some embodiments of the present invention system 50 is employed as a component of an opto-electronic system, in some embodiments of the present invention system 50 is employed as a component of an integrated optical circuit, in some embodiments of the present invention system 50 is employed as a component of a microscopy system, such as, but not limited to, a system for STED microscopy, in some embodiments of the present invention system 50 is employed as a component of a virtual reality system, and in some embodiments of the present invention system 50 is employed as a component of an augmented reality system.

System 50 comprises optical element 10 as further detailed hereinabove, and a non-resonant optical element 56 positioned on the same optical axis with element 10. Non-resonant optical element 56 can be a reflective element, e.g., a mirror, as illustrated in FIG. 2A, or a partially transmissive partially reflective element, as illustrated in FIG. 2B.

In use, an optical field 54, e.g., a polychromatic light beam, is directed to element 10. Optical element 54 is transmitted through the layers of element 10 and interacts with the nanostructures therein such that different wavelengths of the light experience resonant response at different layers of element 10 as further detailed hereinabove. Following the interaction with element 10, the light continues to non-resonant optical element 56. The distances between the individual layers in element 10 and non-resonant optical element 56, are preferably selected such as to set the common reflection (FIG. 2A) or common transmission (FIG. 2B) from or through optical element 56. For example, the layers can be placed at positions selected such that the reflection from element 56 leads to a destructive or instructive interference which in turn leads to either a reflection of resonant frequencies from the different layers, or transmission of the resonant frequencies through the layers.

The distance between each layer and element 56 is optionally and preferably an integer multiplication of about quarter wavelength, or about half wavelength, or about full wavelength, of the central wavelength of that layer.

In some embodiments, optical field 54 is a white light beam, in some embodiments of the present invention optical field 54 carries imagery information, and In some embodiments of the present invention optical field 54 comprises two wavelength bands selected to excite and saturate a fluorescent sample, e.g., for STED microscopy.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Conventional planar optical elements fail to demonstrate broadband, polarization independent optical characteristics.

Conventional planar optical elements fail to demonstrate metasurfaces that can be used for arbitrary frequency bands in the visible regime.

Some embodiments of the present invention provide flat multispectral optical component that can shape different spectral bands of light independently at high efficiencies. The component can work in transmission or reflection and can be applied for, e.g., optical imaging, mobile devices, holograms, virtual reality, augmented reality.

In some embodiments of the present invention a common reflector which can be either a full reflector or a partial is used to influence the transmission or reflection functionality from all of the multispectral layers at once.

In some embodiments of the present invention the efficiency of the optical component is increased in reflection mode to at least 40%.

In some embodiments of the present invention a phase gradient, such as, but not limited to, Pancharatnam Berry Phase is employed. In these embodiments, frequency selective metasurfaces for the multispectral layers placed at predetermined distances from a common partially reflecting thin mirror can results in close to 100% efficiency when shined with circular polarized light. This can be applied for example for cameras, 3D projectors, virtual reality optics, augmented reality optics, microscope collection lenses, multispectral beam shapers, Multiwavelength absorbers, Multiwavelength light trapping for solar cell devices. Any type of frequency selective, phase gradient type surface can be used.

Some embodiments of the present invention provide vertical stacking of independent metasurfaces, where each layer comprises a different material, and is optimally designed for a different spectral band. It was found that such a structure can alleviate the chromatic aberrations of individual diffractive elements. The present inventors demonstrated a triply RGB achromatic metalens in the visible range. The present inventors further demonstrated functional beam shaping by a self-aligned integrated element for STimulated Emission Depletion (STED) microscopy and a lens that provides anomalous dispersive focusing.

Some embodiments of the present invention provide superachromatic ultrathin optical elements and multiple functional operations in a single nanostructured ultrathin element.

In the stacked multilayered metasurfaces, each layer is optionally and preferably fabricated of a different material and with a different design parameters to optimize it for specific frequency band, and if so desired, for a predefined functionality. The layers optionally and preferably consist of metallic disc-shaped-nanoparticles that support Localized Surface Plasmon Resonances (LSPR) in the visible part of the spectrum.

The dependence of the LSPR on the parameters of the nanodiscs and on their material provides control over the spectral response of the layer so that each one operates independently and with minimal spectral cross talk with the others. The present inventors demonstrated that multi-layer elements can be designed using predefined rules, and fabricated with readily available nano-lithography processes, thus facilitating the realization of high performance, multifunctional elements.

With this approach, broadband and multi-functional operation can be achieved, for example, by adding layers. This is an advantage over conventional single layer spatial multiplexing schemes, where the functionality capacity density is limited and requires fabrication of complex metasurface building blocks, especially in the visible, which limits their optical behavior.

The technique of the present embodiments is used to demonstrate an aberration corrected metamaterial-based triplet lens for RGB colors in the visible spectrum, integrated elements for STED microscopy, and elements with anomalous dispersive focusing.

Example 1

Results
Achromatic Multilayer Lens

Figure 3F:
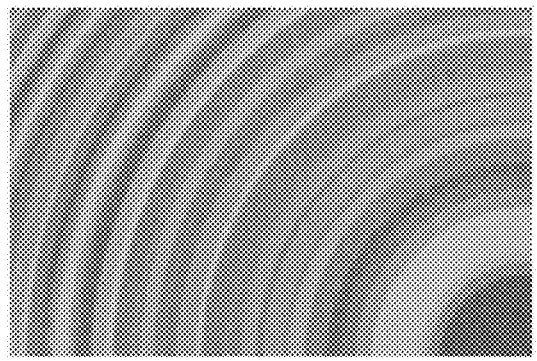
Figure 3G:
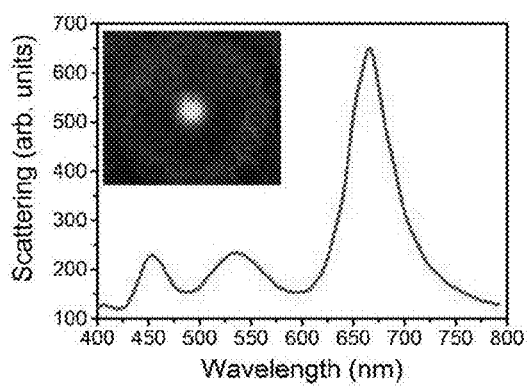

FIGS. 3A-G depict a three layer lens, used in experiments performed according to some embodiments of the present invention. FIG. 3A shows an Artist's view of the three layer lens. When illuminated with white light, each layer focuses its designated part of the spectrum to a distance of 1 mm along the optical axis. FIG. 3B is a schematic illustration of the layered structure (SEM images of the different layers are given below). Each layer consists of nanodiscs with the following diameters D and separations l: $D_{Au}$=125 nm, $l_{Au}$=185 nm; $D_{Ag}$=85 nm, $l_{Ag}$=195 nm; $D_{Al}$=120 nm, $l_{Al}$=150 nm. FIGS. 3C-E are dark field images of single-layer lens elements. The different elements are designed to focus red, green or blue to 1 mm focal distance along the optical axis (Scale bars 35 am). FIG. 3F is a bright field transmission image of the three layer lens. The rings in each layer block a different color, and the darker areas correspond to regions where the zones overlap. FIG. 3G shows a spectrum taken under white light illumination at the focal spot, revealing the red, green and blue components. The inset shows a colored photograph of the obtained white focal spot at 1 mm along the optical axis.

The exemplified lens consists of three closely stacked metasurfaces each composed of nanoantennas made of a different metal: gold, silver, and aluminum, and is designed to optimally interact with light at wavelengths of 650 nm, 550 nm, and 450 nm respectively. Each of the layers acts as a narrow band binary Fresnel Zone Plate (FZP) lens that focuses its targeted light to the common focal point. Within each layer the nanoparticles are closely spaced to avoid diffraction-grating effects. For the present lenses, an interlayer distance of 200 nm was chosen to minimize the near-field cross talk between the individual nanoantennas in the different layers (see specific discussion on spacer thickness in Example 2).

The lenses were fabricated by e-beam lithography as described in the Methods section. The process involved in-situ consecutive steps of lithography, plasma etching, metal evaporation and plasma-enhanced chemical vapor deposition of silica, which served as the dielectric spacer between the metasurfaces. The multilayer process allows stacking the metasurfaces with interlayer stamping precision on the order of magnitude of tens of nanometers, which is crucial for the performance of some of the functions described below. FIG. 3b shows the local design parameters used for the metasurface layers. The respective scanning electron microscope images of the different layers are shown in FIGS. 7A-C of Example 2. An advantage of the fabricated layers is the use of different metals in different layers so as to improve, more preferably optimize, the performance of the composite 3D metasurface. The use of gold for the red part of the spectrum, silver for the green and aluminum for the blue allowed decreasing the size of the building blocks in each layer and thus to reduce the spectral cross talk between the different layers. The disk-shape structures were chosen due to their polarization-independent tunable plasmonic resonances, but other shapes are also in some embodiments of the present invention. FIG. 3c-e show dark-field microscope images of the individual metasurface lenses. The metasurfaces were illuminated with white light and as can be clearly evidenced, each of the metasurfaces strongly scatters light at the designated color.

In the present Example, the Fresnel binary zone plate configuration[42] was used for the individual lenses. The radii of the opaque concentric rings are given by:

$$r_n^2 = n\lambda\left(f + \frac{n\lambda}{4}\right) \quad (1.1)$$

where $r_n$ is the $n^{th}$ zone radius, $\lambda$ is the wavelength and f is the focal distance. Rewriting equation (1.1) as a function of f gives:

$$f(\lambda) = \left[r_n^2 - \frac{(n\lambda)^2}{4}\right]/(n\lambda) \quad (1.2)$$

Equation (1.2) reveals the dispersive character of the diffractive lenses (see also FIG. 8 of Example 2). For example, in the case of a conventional zone plate designed to focus green light $\lambda$=550 nm) to 1 mm away from the lens, the focal plane of the entire visible spectrum is spanned over more than 400 µm. This chromatic aberration is the main hindrance preventing the use of such lenses for broadband or multi-wavelength applications. However, by utilizing frequency selective metasurfaces according to preferred embodiments of the present invention a generalized expression for $f(\lambda)$ can be derived for each surface:

$$f_1(\lambda) = \{\Theta(\lambda-\lambda_{min,i}) - \Theta(\lambda-\lambda_{max,i})\}f(\lambda) \quad (1.3)$$

where i indicates the surface number, $\Theta$ is the Heaviside step function, and $(\lambda_{min}, \lambda_{max})$
is the spectral band of interest. Summing over all surfaces the response of the multilayer composite device is obtained as follows:

$$f(\lambda) = \Sigma_i\{\Theta(\lambda-\lambda_{min,i}) - \Theta(\lambda-\lambda_{max,i})\}f_i(\lambda) \quad (4)$$

In this Example this approach is demonstrated by dividing the visible spectrum to 3 spectral bands.

FIG. 3f shows a bright-field image of the three-layer element. Note that the zones for each color do not fully overlap, since each layer is designed for a different color to be focused to the same focal position of 1 mm (equation (1.1)). In fact, the total overlap of the layers is approximately 95%. This demonstrates an additional advantage of the system of the present embodiments compared to spatial multiplexing techniques[43], where the number of subwavelength inclusions is physically limited.

Firstly, the lens was illuminated with white light (Xenon arc lamp), and the spectrum at the focal spot was measured. The result is shown in FIG. 3g, where the three designed spectral RGB components at 650 nm, 550 nm and 450 nm are clearly visible, thus creating the desired white focal spot, as seen in the inset of FIG. 3g. The transmission peak in the red is higher than the other two due to better fabrication and probably also larger wavelength to diameter ratio of the gold nanodiscs. Without wishing to be bound to any particular theory, the slight inaccuracies in the target wavelengths are believed to relate to shifts between the design dimensions and actual fabrication results.

Figure 4A:
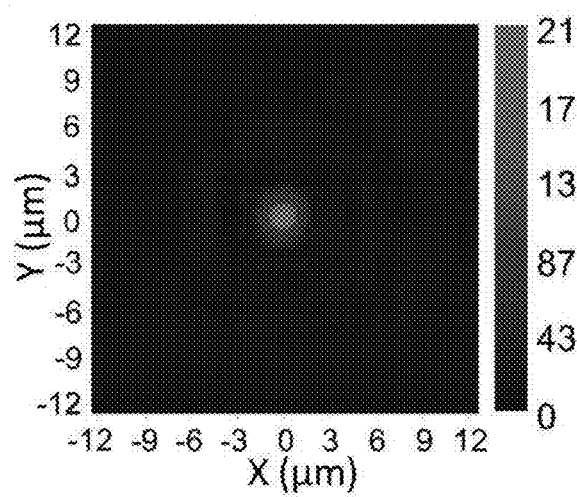
Figure 4B:
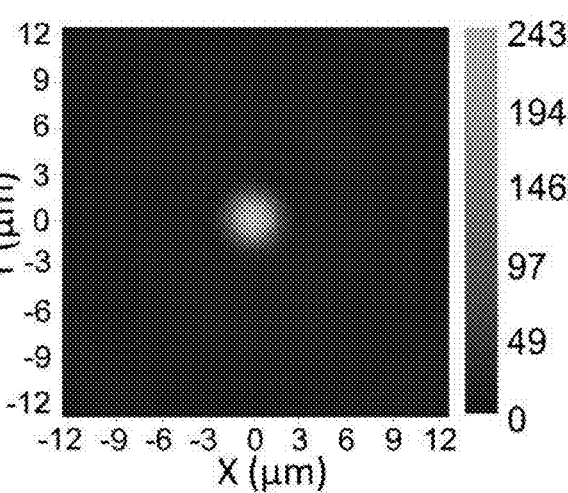
Figure 4C:
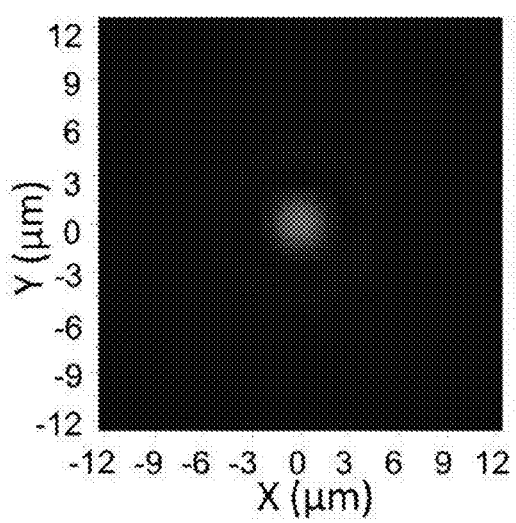
Figure 4D:
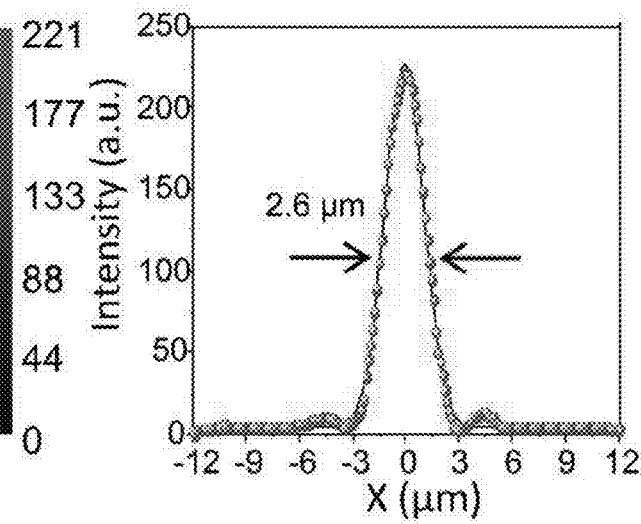
Figure 4E:
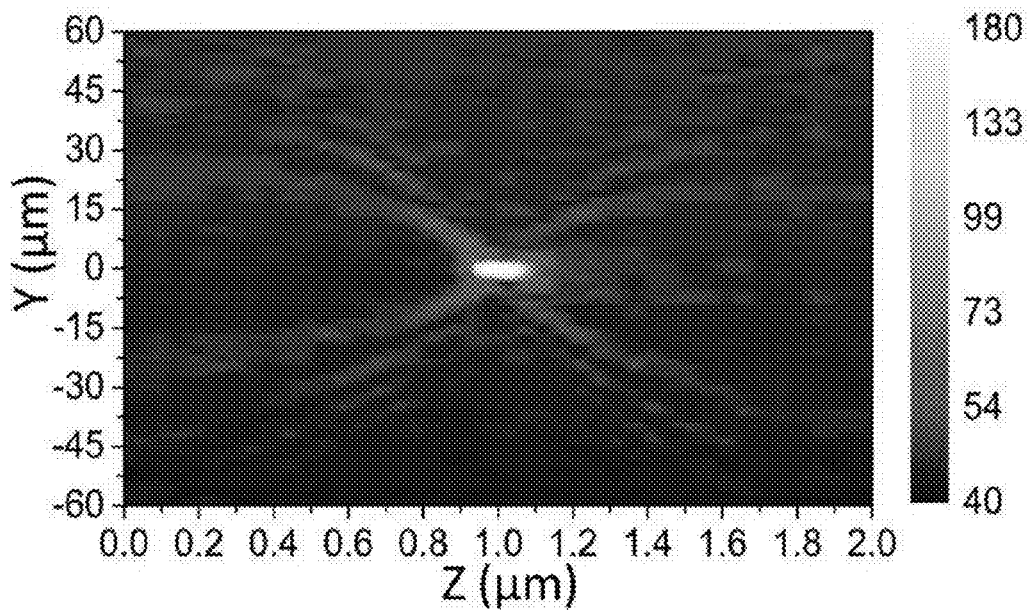

FIGS. 4A-E show focusing lens beam characterization with laser illumination, as obtained in experiments performed according to some embodiments of the present invention. FIGS. 4A-C show focal spots under blue, green, and red laser illuminations. FIG. 4D shows a cross section of the beam profile in focus. The data points were fitted to a Gaussian profile. FIG. 4E shows focusing of the lens under red laser illumination.

To characterize the focusing properties of the three individual lenses, laser illumination was used at the different wavelengths (see Methods). The results are shown in FIGS. 4a, 4b, and 4c for illumination at 450 nm, 550 nm and 650 nm respectively. The focal spot diameters for the different colors were measured by sampling 20 points within the expected focal depth region (see Methods and FIG. 9 of Example 2). The full width at half maximum (FWHM) for each color at the focal point was measured to be about 2.6 µm, about 2.43 µm and about 2.11 µm for red, green and blue wavelengths, respectively (see FIGS. 4d and 4e), in good agreement with theoretical values. The focusing transmission efficiency was also measured for each wavelength, and found to be in the range of from about 5.8% to about 8.7%, which is well within the range of the theoretical value of about 10% for binary diffractive lenses[42]. Note that increased experimental efficiency can be obtained by optimizing each layer's optical response, e.g. by increasing the spectral extinction ratio of each of the layers.

Different configurations, such as, but not limited to, a reflection type phase binary zone plate, can be used according to some embodiments of the present invention with expected theoretical efficiencies of at least 2 times or at least 3 times, typically up to 4 times or more, of the efficiency of a standard binary zone plate (see detailed description of the metasurface-based phase binary zone plate in Example 2). The efficiency can be further improved according to some embodiments of the present invention, for example, by impedance matching[44].

To compare the broadband operation of the new lens to a conventional binary FZP lens a conventional binary FZP has also been fabricated (see Methods). Both lenses were illuminated with white light (Xenon arc lamp), and the light propagations after the lenses were characterized.

Figure 5C:
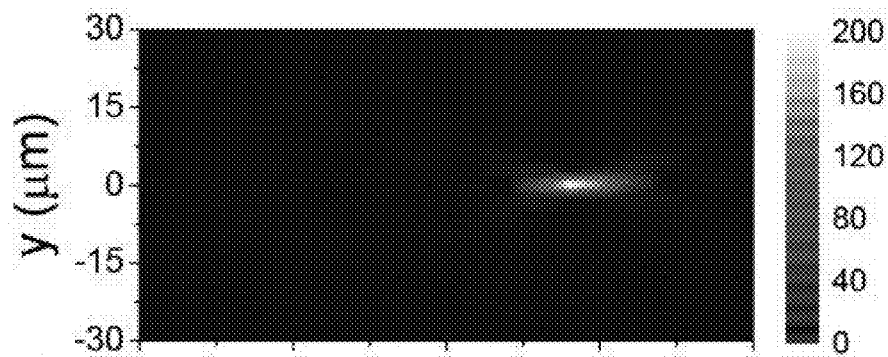

FIGS. 5A-I show chromatically corrected three layer metasurface lens, used in experiments performed according to some embodiments of the present invention. Measured light focusing with conventional FZP (FIG. 5A) and the metasurface FZP of the present embodiments (FIG. 5B) under white light illumination (Xenon arc lamp, contrast normalized for viewing purposes). Chromatic aberration is apparent in (FIG. 5A) while the focal spot at 1 mm appears white in (FIG. 5B). Images of the focal region for a conventional FZP illuminated by laser light at 450 nm (FIG. 5C), 550 nm (FIG. 5D) and 650 nm (FIG. 5E) and for the metasureface FZP of the present embodiments (FIGS. 5F-H), showing the aberration correction for the latter. FIG. 5I shows theoretical calculation (cf. equation (1.2)) of the focal distance for a conventional FZP (red line) and the measured focal points at the RGB wavelengths of the conventional FZP (crosses) and metasurface FZP (circles).

FIGS. 5a and 5b show the light propagation after the conventional FZP (FIG. 5a) and the multilayer metasurfaces lens of the present embodiments (FIG. 5b). As shown, for the case of the conventional FZP (FIG. 5a) the focus is chromatically aberrated by more than 400 µm. On the other hand, for the multilayer metasurfaces lens of the present embodiments (FIG. 5b) the chromatic aberrations are corrected and a white focus is formed at about 1 mm away from the lens.

Figure 5D:
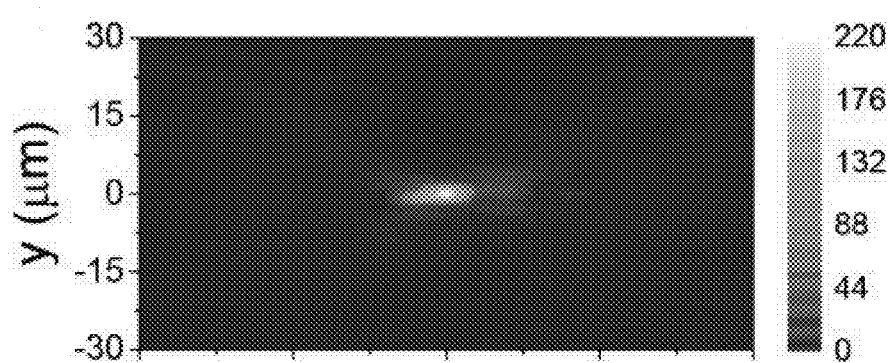
Figure 5E:
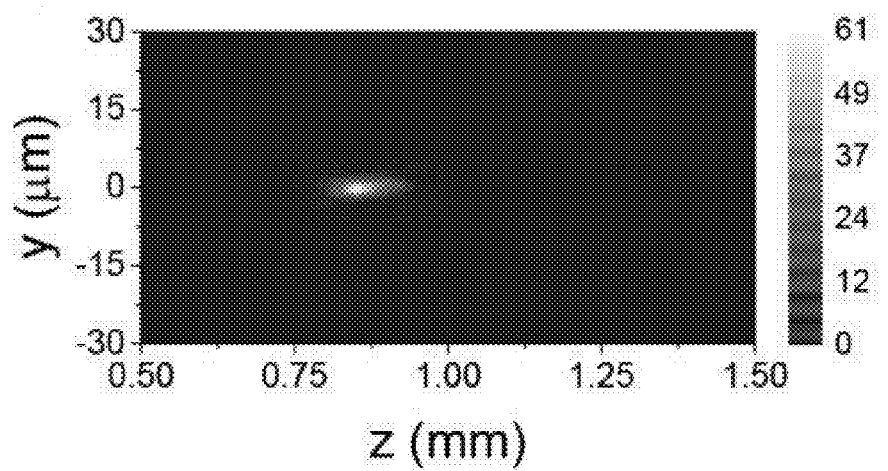
Figure 5F:
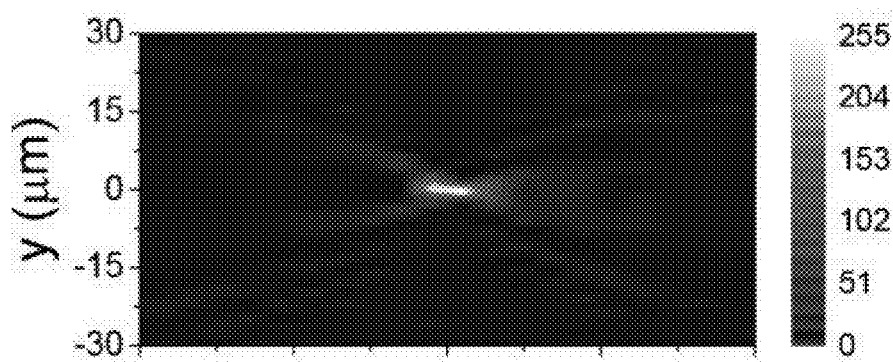
Figure 5G:
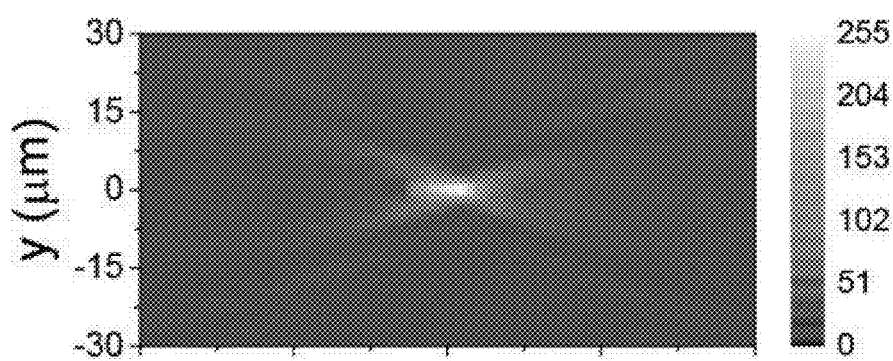
Figure 5H:
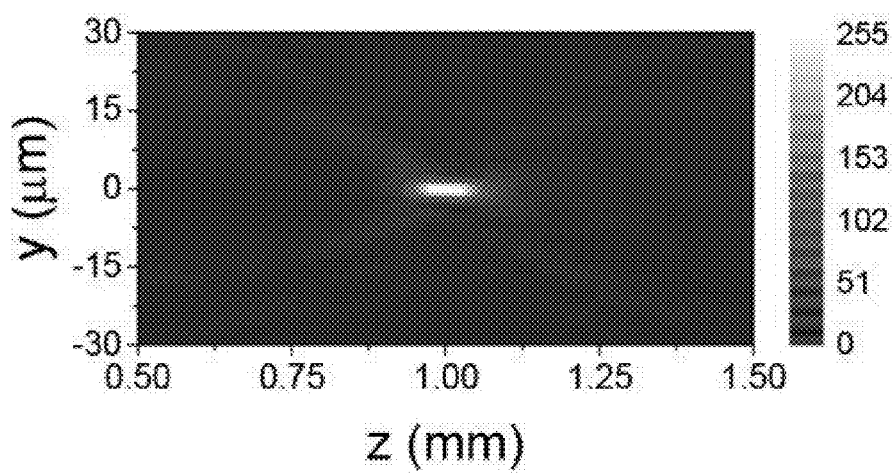

The background of the conventional FZP is darker since it was fabricated as transparent rings in a continuous thin film, thus blocking background illumination. Also, its dynamic range is somewhat larger than the fabricated metasurfaces based FZP that show lower extinction compared to continuous films. FIG. 5c-e show the performance of conventional FZP with a laser illumination (see Methods) at wavelengths of about 450, about 550 and about 650 nm, respectively. FIG. 5f-h show the performance of the composite metasurface of the present embodiments, for the same wavelengths. The improved chromatic aberration correction of the composite metasurface at these wavelengths is vivid. FIG. 5i depicts the measured focal distance as a function of the wavelength for the uncorrected and corrected lenses. This measured low spread of the wavelength-dependent focal plane, and low cross talk between the different layers, enables the lens of the present embodiments to perform chromatic imaging, as presented in FIG. 13B (see Example 2).

As one moves away from the design wavelengths, the triplet lens shows residual chromatic aberration due to the finite bandwidth of the plasmonic resonators (see FIG. 8 of Example 2). At the design wavelengths, however, the residual power of the other wavelengths was measured to be less than 10% of the main beam. This residual cross talk, albeit already small, can be even further decreased according to some embodiments of the present invention by reducing the fabrication errors and/or by designing resonators with higher quality factors and therefore sharper linewidths. This constitutes another advantage of the composite material approach of the present embodiments. While in principle aluminum or silver nanoresonators can be designed to cover the entire visible range and can be fabricated in a single metasurface, this task typically requires the use of larger or more complex shapes (such as nanorods) which are polarization sensitive. These more complex shapes may develop higher-order modes (or multiple resonances) at undesired wavelengths or larger radiative losses that would increase the residual chromatic aberration. The use of different materials for the different spectral regions, according to some embodiments of the present invention, alleviates these problems.

Multifunctional Multilayer Elements

The multilayered metasurfaces approach allows multiplexing several beam manipulation functionalities into a single optical element. To exploit these introduced capabilities, a multilayer integrated element that can be used for super-resolution STED microscopy was fabricated. In STED, one laser beam with a Gaussian profile is tightly focused to excite a fluorescent sample, and a second, co-aligned doughnut shaped beam with zero intensity at its center depletes the emission by saturating the fluorescent transition. Thus, fluorescence is collected only from the much smaller non-depleted region. Using this method, resolution much better than the diffraction limit had been demonstrated (e.g. references[45,46]). Typically, the optical arrangement of such a system involves an optical setup for generating a doughnut shaped beam, with a fluorescence pump beam at its center, coupled to optics for collection of the fluorescence at the third frequency from the center region.

In the present Example, the freedom to independently choose different materials and specific designs for each layer was utilized so as to demonstrate an integrated STED lens, consisting of a dual-layer that tightly focuses green light with a full round beam profile, and red light to a doughnut-shaped beam at the same focal spot. An FZP configuration was used for the excitation focus and a spiral based FZP fabricated on top, for the depletion beam that leads to generation of a doughnut beam at its focus[47].

Figure 6E:
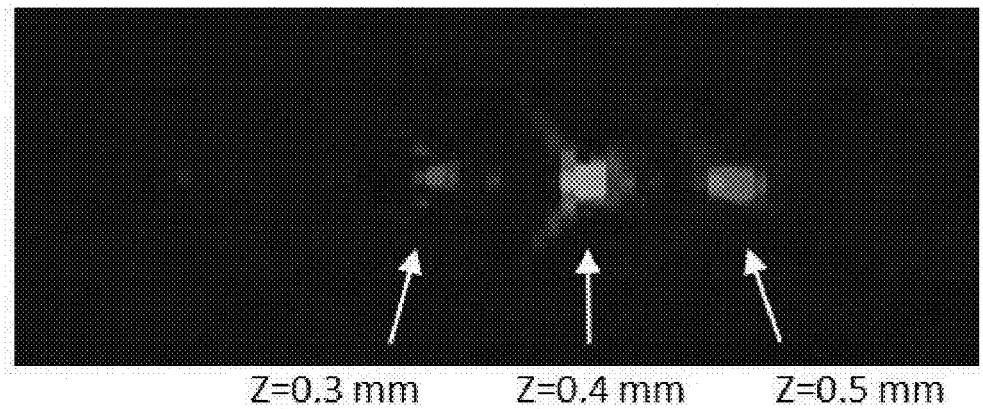

FIGS. 6A-E show results obtained for complex lenses in experiments performed according to some embodiments of the present invention. FIGS. 6A and 6B show a dual-layer STED element composed of one layer designed to focus green laser ($\lambda$=550 nm) at f=1 mm and a second spiral shaped layer designed to focus a doughnut-shaped red laser beam ($\lambda$=650 nm) at the same focal distance. The topological charge of the spiral beam was set to l=1. FIGS. 6C and 6D depict the situation for a tightly focused green beam, and a spiral red beam with l=4 both focused to 1 mm. The interference between the generated vortex beam and a background beam transmitted by the plate gives rise to the spiral-shaped vortex in FIG. 6B and the four lobe vortex in FIG. 6D. FIG. 6E shows a demonstration of the functionality of a lens that was designed to show anomalous chromatic aberration of its RGB foci, wherein shorter wavelengths focus before longer wavelengths (Contrast was enhanced for viewing purposes).

FIGS. 6a and 6c show bright field reflection images of two such fabricated devices, implementing lenses with different topological charges l=1 and l=4 respectively. The performances of the fabricated devices was tested with a super-continuum laser as the illumination source (see Methods), and the results shown in FIGS. 6b and 6d, are in good agreement with simulated results.

An optical element with different focusing features or different wavelengths can be used in a wide range of applications. As another example, a lens with anomalous chromatic dispersion was demonstrated. In this lens, the shorter wavelengths were focused first: e.g. blue, green and red colors were focused to 300, 400 and 500 μm respectively. The measured performance of such an anomalous lens is shown in FIG. 6e. Such an optical device can be used for example, in the optical readout of multimedia disks which combine Blue-Ray, DVD and CD, without the need to use beam splitters or movable lenses. This optical element thus acts as a multiband filter and a lens all-in-one device.

Discussion

In this Example a new nanotechnology-driven approach to create thin, multifunctional, and spectrally multiplexed optical elements was demonstrated. The approach was used to demonstrate the chromatically corrected metasurface triplet lens for RGB colors in the visible, integrated self-aligned STED elements, and a diffractive lens with anomalous chromaticity. These elements are based on a multi-layer design concept, where each layer is composed of nanoresonators made of the dedicated plasmonic material and designed to operate in a specific spectral band. The combined multi-layer elements show complex functionalities, otherwise unachievable with conventional diffractive optics. Due to its simple design, ease of fabrication, ultra-thin profile and low inter-layer crosstalk, our multi-layer, multi-material design could find applications in integrated optoelectronic devices, imaging systems and complex microscopy setups.

The efficiencies can be improved by optimizing each layer's optical response, for example, by increasing the spectral extinction ratio of each of the layers. Other configurations such as reflection type phase binary zone plates, are also contemplated. Further contemplated is the use of impedance matching (more details are given in Example 2).

Design capabilities in dual- and triple-layer configurations were demonstrated. The present embodiments contemplate any number of layers. The present embodiments contemplate other materials, building block geometries, and layer designs[6,10,25-27] This can increase the composite metasurface efficiency, allow covering spectral ranges beyond the visible, and can optionally provide hyperspectral functionality. These embodiments are particularly useful for multifunctional optical Applications.

Methods

Numerical Simulations

To study the resonant behavior of the metallic nanoantennas, a commercially available finite difference time domain simulation software package was used (Lumerical FDTD). The 3 dimensional simulation was performed with periodic boundary conditions representing a periodic array within each zone of the fabricated optical elements. The focusing properties of the lenses and STED device was simulated using a beam propagation algorithm based on the transfer function in free space which was implemented using MATLAB software. See also Supplementary materials.

Samples Fabrication

The samples were fabricated using multilayer e-beam lithography. An Indium-Tin-Oxide (ITO) covered glass was used as the substrate. A 200 nm thick silica layer was grown on top of the ITO film by plasma-enhanced chemical vapor deposition (PECVD). A 125 nm thick e-beam resist (PMMA 950 k A) was then spin coated and the design pattern were exposed in an electron beam lithography. Alignment marks were also written to aid the stamping process of subsequent layers. After development of the resist 30 nm of the exposed silica was etched using inductively coupled plasma. A 30 nm thick gold film was then deposited by e-beam evaporation and subsequently lifted-off in acetone in an ultrasonic bath. This first layer was covered by a 200 nm thick silica layer grown by PECVD. The process was repeated for the silver and aluminum layers. The aluminum layer was left exposed to the air, where a self-formed passivating aluminum dioxide prevents further degradation of the aluminum disks.

Experimental Setup and Measurement of Fabricated Devices

A Zeiss (Observer Z1) inverted microscope was used to image the samples in transmission, reflection, bright and dark field modes. The focusing properties were measured by a home built microscope setup. The emission from the sample was collected with a Mitutoyo 20×0.42 objective, and the sample was mounted on an automated moving stage (Thorlabs Nanomax 606). A Xenon arc lamp was used as an unpolarized white light source and a femtosecond optical parametric oscillator (Chameleon OPO VIS, pulse width ~140 fs, repetition rate 80 MHz) as the linearly polarized laser source. A similar setup was used to study the STED element performance, with a super-continuum laser as the illumination source (NKT SuperK compact). The spectral properties of the lenses were obtained using an imaging spectrometer with a cooled back-illuminated EMCCD detector (Andor Shamrock 303i, Newton 970). The imaging of the RGB pattern was done with an LED projector and subsequent optics that were used to project the RGB pattern to the field of view of the fabricated lens.

Example 2

SEM Images of the Multilayer Lens

FIGS. 7A-C shows scanning electron microscope (SEM) images of sections of the multi-layer lens, showing arrays of nanoparticles for the three different layers: gold nanoparticles (FIG. 7A, scale bar: 400 nm); silver nanoparticles (FIG. 7B, scale bar: 300 nm); and aluminum nanoparticles (FIG. 7C, scale bar: 400 nm). FIG. 7B for example, shows the silver nanoparticle layer, with the gold nanoparticles located at the bottom layer, clearly visible at the background. The measured dimensions of each layer are (D—diameter of nanoparticles, l—separation between particles): $D_{Au}=125$ nm, $l_{Au}=185$ nm; $D_{Ag}=85$ nm, $l_{Ag}=195$ nm; $D_{Al}=120$ nm, $l_{Al}=150$ nm. These values slightly differ from the design values due to fabrication accuracy limitations. In addition, it can be seen that the aluminum nanoparticles (right pane) are less uniform in shape and size, leading to a broader, non-symmetric resonance behavior of this layer.

Chromatic Dispersion of the Composite Lens

FIG. 8 shows measured focal spots across visible spectrum (blue circles). The dashed black line showing the chromatic behavior of a conventional FZP, reduces to three curves, lowering chromatic aberrations across the visible spectrum. Blue, green and red curves represent the theoretical focal distance vs. wavelength curves for conventional FZPs, designed to focus at 1 mm wavelengths of 450 nm, 550 nm and 650 nm, respectively. The measured focal points are shown along the optical axis of the three layer fabricated device, for the wavelengths range of 410 nm-690 nm in steps of 20 nm. Comparing the measurement to the theoretical fit of a conventional binary zone plate (black dashed line), one sees that the single curve is now divided into three curves, corresponding to $f_{1,2,3}(\lambda)$ of the three spectral bands (see eqs. (1.1)-(1.4)). The plot clearly shows the significant reduction of the chromatic aberrations compared with a conventional FZP for white light illumination.

Dielectric Spacer Thickness Calculations

In order to minimize crosstalk between layers, a 200 nm $SiO_2$ spacer was used between layers. FIG. 9 shows the effect of spacer thickness (x axis) on the resonance properties of the gold and silver metasurface layers (color bar indicates transmittance). At thicknesses below 90 nm, coupling effects result in changes of the resonance properties of the individual layers. Shown in FIG. 9 is an FDTD simulation result of optical transmission through 2 such layers, in this case Au and Ag, spaced with $SiO_2$. As shown, coupling effects start to be more significant as the spacer thickness was decreased below 90 nm. Between 70 nm and 90 nm no large shift in the resonance of either nanoparticle was observed, but the width of the peaks, and extinction amplitude changes are clearly visible. Similar numerical tests performed on the Al layer and the Ag layer, have shown very similar behavior, with no cross coupling above 90 nm spacing. Without wishing to be bound to any particular theory, it is estimated that any spacer thickness down to 100 nm should perform similarly. Larger thicknesses may result in unwanted cavity effects. However, in the present Example, as the spectral crosstalk between the different layers is less than 10%, these cavity effects will not modify the overall response considerably.

Focal Spot Characterizations

To determine the focal plane, and the beam diameter at this plane, 20 points were sampled along the propagation direction near the expected focal region, and the width of the Gaussian beam was measured at each plane. The measured points were fitted to the theoretical propagation of a Gaussian beam along the optical axis, which is given by:

$$\omega(z) = \omega_0 \sqrt{1 + \left(\frac{z}{z_R}\right)^2} \quad (2.8)$$

where $\omega_s$ is the beam waist, and $\Xi_R$ is Rayleigh range. The measured focused beam and the fit to the data points for the red beam at 650 nm are plotted in FIGS. 10A and 10B, where FIG. 10A shows the focal spot divergence along the optical axis, for λ=650 nm, and FIG. 10B shows the measured Gaussian width (crosses) and the theoretical fit (red curve) to Equation 2.8. The FWHM of the beam (2.3 μm) was extracted at the calculated focal point.

Lens Efficiency Calculation

The efficiency of the binary FZP is defined as the total power at the primary focal spot relative to the total power incident upon the lens. A calibrated CMOS camera was used to measure both. The method described above was used to find the focused beam waist. The focused beam was fitted to a Gaussian profile and the power was then measured at the beam waist, covering approximately 86% of the total power.

Lens Design for Enhanced Efficiency

In order to enhance the efficiency and imaging properties of binary lenses, different designs had been suggested, including phase zone plates, azimuthally modified zone plates (e.g. the Beynon Gabor zone plate), and photon sieves[1]. Changing the opaque zones in a conventional zone plate to transparent zones that provide an additional π phase shift, can result in increased efficiency at the primary foci to about 40%. This device is termed herein phase Fresnel Zone Plate (pFZP). FIG. 5a illustrates a possible implementation of a 3 layer reflection type pFZP based on our multi-layer metasurface design scheme. As in the binary FZP design, each layer focuses a different part of the spectrum. Unlike the binary FZP, the distance of each layer from the mirror (colored double-sided arrows), was calculated to impose a roundtrip 7C phase shift relative to the backward scattered plane wave, effectively creating a pFZP. FIG. 5b shows the simulated cross section of the optical field intensity at the primary focal result (simulated by beam propagation method in MATLAB), comparing the efficiency at the primary focus of a conventional FZP and the proposed metasurface pFZP, showing 4 times increase in efficiency.

FIG. 11A is a schematic illustration of a 3 layer metasurface pFZP, and FIG. 11B shows cross section of the focal plane intensity, 1 mm along the z direction, of a conventional FZP (blue line), and a metasurface pFZP (green line), demonstrating 4 times efficiency enhancement.

Beam Propagation Optical Simulations

To analyze the wavelength-scale performance of our devices, the optical waves were simulated using a Fourier beam propagator, implemented in MATLAB. In the simulation, a Gaussian beam was assumed to normally incident on the device. The simulated device and the optical field at the focal point are presented in FIGS. 12A-D, showing binary Fresnel zone plate (FIG. 12A) and the field distribution (FIG. 12B) at 1 mm along the optical axis. The spiral shaped mask in (FIG. 12C) generates a doughnut shaped beam at the focal spot, as seen in (FIG. 12D).

To generate a doughnut shaped beam for the STED element, a spiral-shaped binary structure was used according to the following relation $$\text{mask} = \frac{1}{2}\left(1 + \cos\left(\left(k\frac{r^2}{2f}\right) + l\theta\right)\right) \quad (2.9)$$

where f is the focal distance, θ and r are the polar coordinates of the system, and l is the topological charge. Two spiral masks were generated, with topological charges of l=1 (FIG. 12C) and l=4.

This structure differs from a conventional zone plate that focuses light to the designed focal point, in that it has a phase singularity along the optical axis which comes from the spiral structure. This creates at the focal point the desired doughnut beam as shown in FIG. 12D. The STED element is therefore composed of two layers: The first layer is composed of Au nanodiscs, designed to interact with red light, around 650 nm, and focus it into a doughnut beam at 1 mm along the optical axis. The second layer is composed of Ag nanodiscs, designed to interact with green light, around 550 nm, and focus it to 1 mm along the optical axis. All dimensions, i.e. spacer thickness, nanodiscs diameters and inter-particle spacing are identical to the ones used for the 3 layer metasurface lens (see FIGS. 3A-G).

Imaging with Metasurface Lens

A commercial projector and a 4f system was used to project a digital image of size comparable to the lens size (~500 μm), to the field of view of the fabricated multi-layer lens. The image formed by the lens was then collected with an objective lens (Mitutoyo 20×0.42), and then imaged on a color CCD. The original projected image and the image formed on the CCD are given in FIGS. 13A and 13B, where FIG. 13A shows the RGB projected pattern that served as the object for the metasurface lens, and FIG. 13B shows an image collected by the color CCD.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

1. Koenderink, A. F., Alu, A. & Polman, A. Nanophotonics: Shrinking light-based technology. *Science* 348, 516-521 (2015).
2. Yu, N. & Capasso, F. Flat optics with designer metasurfaces. *Nat. Mater.* 13, 139-150 (2014).
3. Kildishev, A. V, Boltasseva, A. & Shalaev, V. M. Planar photonics with metasurfaces. *Science* 339, 1232009 (2013).
4. Yu, N. et al. Light Propagation with Phase Discontinuities: Generalized Laws of Reflection and Refraction. *Science* 334, 333-337 (2011).
5. Ni, X., Emani, N. K., Kildishev, A. V, Boltasseva, A. & Shalaev, V. M. Broadband light bending with plasmonic nanoantennas. *Science* 335, 427 (2012).
6. Lin, D., Fan, P., Hasman, E. & Brongersma, M. L. Dielectric gradient metasurface optical elements. *Science* 345, 298-302 (2014).
7. Khorasaninejad, M. et al. Achromatic Metasurface Lens at Telecommunication Wavelengths. *Nano Lett.* 15, 5358-62 (2015).

8. Khorasaninejad, M. et al. Metalenses at visible wavelengths: Diffraction-limited focusing and subwavelength resolution imaging. Science 352, 1190-4 (2016).
9. Chen, X. et al. Dual-polarity plasmonic metalens for visible light. Nat. Commun. 3, 1198 (2012).
10. Arbabi, A., Horie, Y., Bagheri, M. & Faraon, A. Dielectric metasurfaces for complete control of phase and polarization with subwavelength spatial resolution and high transmission. Nat. Nanotechnol. 10, 937-943 (2015).
11. Eisenbach, O., Avayu, O., Ditcovski, R. & Ellenbogen, T. Metasurfaces based dual wavelength diffractive lenses. Opt. Express 23, 3928-36 (2015).
12. Arbabi, E., Arbabi, A., Kamali, S. M., Horie, Y. & Faraon, A. High efficiency double-wavelength dielectric metasurface lenses with dichroic birefringent meta-atoms. Opt. Express 24, 18468 (2016).
13. Huang, L. et al. Dispersionless Phase Discontinuities for Controlling Light Propagation. Nano Lett. 12, 5750-5755 (2012).
14. Avayu, O., Eisenbach, O., Ditcovski, R. & Ellenbogen, T. Optical metasurfaces for polarization-controlled beam shaping. Opt. Lett. 39, 3892-5 (2014).
15. Aieta, F. et al. Aberration-free ultrathin flat lenses and axicons at telecom wavelengths based on plasmonic metasurfaces. Nano Lett. 12, 4932-6 (2012).
16. Zhao, Z. et al. Multispectral optical metasurfaces enabled by achromatic phase transition. Sci. Rep. 5, 15781 (2015).
17. Wen, D. et al. Helicity multiplexed broadband metasurface holograms. Nat. Commun. 6, 8241 (2015).
18. Maguid, E. et al. Photonic spin-controlled multifunctional shared-aperture antenna array. Science 352, 1202-6 (2016).
19. Lin, J., Genevet, P., Kats, M. A., Antoniou, N. & Capasso, F. Nanostructured holograms for broadband manipulation of vector beams. Nano Lett. 13, 4269-74 (2013).
20. Tsur, Y., Epstein, I. & Arie, A. Arbitrary holographic spectral shaping of plasmonic broadband excitations. Opt. Lett. 40, 1615-1618 (2015).
21. Walther, B. et al. Spatial and Spectral Light Shaping with Metamaterials. Adv. Mater. 24, 6300-6304 (2012).
22. Larouche, S., Tsai, Y. J., Tyler, T., Jokerst, N. M. & Smith, D. R. Infrared metamaterial phase holograms. Nat. Mater. 11, 450-454 (2012).
23. Ni, X. et al. Metasurface holograms for visible light. Nat. Commun. 4, 777-778 (2013).
24. Huang, L. et al. Three-dimensional optical holography using a plasmonic metasurface. Nat. Commun. 4, 77-79 (2013).
25. Zheng, G. et al. Metasurface holograms reaching 80% efficiency. Nat. Nanotechnol. 10, 308-312 (2015).
26. Yifat, Y. et al. Highly efficient and broadband wide-angle holography using patch-dipole nanoantenna reflectarrays. Nano Lett. 14, 2485-90 (2014).
27. Chen, W. T. et al. High-efficiency broadband meta-hologram with polarization-controlled dual images. Nano Lett. 14, 225-30 (2014).
28. Kauranen, M. & Zayats, A. V. Nonlinear plasmonics. Nat. Photonics 6, 737-748 (2012).
29. Klein, M. W., Enkrich, C., Wegener, M. & Linden, S. Second-harmonic generation from magnetic metamaterials. Science 313, 502-4 (2006).
30. Salomon, A., Zielinski, M., Kolkowski, R., Zyss, J. & Prior, Y. Size and Shape Resonances in Second Harmonic Generation from Silver Nanocavities. J. Phys. Chem. C 117, 22377-22382 (2013).
31. Segal, N., Keren-Zur, S., Hendler, N. & Ellenbogen, T. Controlling light with metamaterial-based nonlinear photonic crystals. Nat. Photonics 9, 180-184 (2015).
32. Almeida, E., Shalem, G. & Prior, Y. Nonlinear Phase Control and Anomalous Phase Matching in Plasmonic Metasurfaces. Nat. Commun. 7, 10367 (2015).
33. Wolf, O. et al. Phased-array sources based on nonlinear metamaterial nanocavities. Nat. Commun. 6, 7667 (2015).
34. Keren-Zur, S., Avayu, O., Michaeli, L. & Ellenbogen, T. Nonlinear Beam Shaping with Plasmonic Metasurfaces. ACS Photonics 3, 117-123 (2016).
35. Tymchenko, M. et al. Gradient Nonlinear Pancharatnam-Berry Metasurfaces. Phys. Rev. Lett. 115, 207403 (2015).
36. Almeida, E., Bitton, O. & Prior, Y. Nonlinear metamaterials for holography. Nat. Commun. 7, 12533 (2016).
37. Aieta, F. et al. Multiwavelength achromatic metasurfaces by dispersive phase compensation. Science 347, 1342-1345 (2015).
38. Arbabi, E. et al. Multiwavelength metasurfaces through spatial multiplexing. Sci. Rep. 6, 32803 (2016).
39. Arbabi, E., Arbabi, A., Kamali, S. M., Horie, Y. & Faraon, A. Multiwavelength polarization-insensitive lenses based on dielectric metasurfaces with meta-molecules. Optica 3, 628 (2016).
40. Liu, N. et al. Three-dimensional photonic metamaterials at optical frequencies. Nat. Mater. 7, 31-7 (2008).
41. Zhao, Y., Belkin, M. A. & Alù, A. Twisted optical metamaterials for planarized ultrathin broadband circular polarizers. Nat. Commun. 3, 870 (2012).
42. Young, M. Zone Plates and Their Aberrations. JOSA 62, 972-976 (1972).
43. Arbabi, E. et al. Multiwavelength metasurfaces through spatial multiplexing. Sci. Rep. 6, 32803 (2016).
44. Monticone, F., Estakhri, N. M. & Alù, A. Full Control of Nanoscale Optical Transmission with a Composite Metascreen. Phys. Rev. Lett. 110, 203903 (2013).
45. Hell, S. W. & Wichmann, J. Breaking the diffraction resolution limit by stimulated emission: stimulated-emission-depletion fluorescence microscopy. Opt. Lett. 19, 780 (1994).
46. Rittweger, E., Han, K. Y., Irvine, S. E., Eggeling, C. & Hell, S. W. STED microscopy reveals crystal colour centres with nanometric resolution. Nat. Photonics 3, 144-147 (2009).
47. Londoño, N., Rueda, E., Gómez, J. A. & Lencina, A. Generation of optical vortices by using binary vortex producing lenses. Appl. Opt. 54, 796 (2015).
48. Vierke, T. & Jahns, J. Diffraction theory for azimuthally structured Fresnel zone plate. J. Opt. Soc. Am. A. Opt. Image Sci. Vis. 31, 363-72 (2014).

What is claimed is:

1. A multilayer optical element, comprising a plurality of layers arranged along an optical axis, each layer having a plurality of nanostructures, wherein a size of—and a spacing between—said nanostructures is selected to provide a resonant response to a polychromatic optical field at a different wavelength, and wherein a distance between said layers is selected to induce destructive or constructive interference of components of said polychromatic optical field within a spectral crosstalk among said resonant responses, said spectral crosstalk being defined as an overlap between curves describing interaction amplitudes of said polychromatic optical field with said nanostructures of respective layers.

2. The optical element according to claim 1, wherein for each layer, a standard deviation of a size of said nanostructures is less than 20% of an average size of said nanostructures.

3. The optical element according to claim 1, wherein each layer comprises nanostructures made of a different metal.

4. The optical element according to claim 3, wherein said plurality of layers comprises a first layer having gold nanostructures sized and spaced apart to provide a resonant response to an optical field at a first wavelength, a second layer having silver nanostructures sized and spaced apart to provide a resonant response to an optical field at a second wavelength being shorter than said first wavelength, and a third layer having aluminum nanostructures sized and spaced apart to provide a resonant response to an optical field at a third wavelength being shorter than said second wavelength.

5. The optical element according to claim 1, wherein for each layer, said nanostructures are arranged to form a zone plate.

6. The optical element according to claim 1, wherein said nanostructures of said layers are arranged to focus said different wavelengths onto the same focal plane.

7. The optical element according to claim 1, wherein nanostructures of one of said layers are arranged to focus a respective wavelength to a spot at a focal plane, and nanostructures of another one of said layers are arranged to focus a respective wavelength to an annulus surrounding said spot at said focal plane.

8. The optical element according to claim 1, wherein said plurality of layers comprises two or more pairs of layers, wherein for each pair of layers, a size of—and a spacing between—nanostructures of both layers in said pair is selected to provide a resonant response to an optical field at the same wavelength.

9. An optical system, comprising a reflective element and the optical element according to claim 1 placed in front of a reflective surface of said reflective element.

10. A method of shaping a light beam, comprising passing the light beam through the optical system according to claim 9.

11. An imaging system, comprising the optical system according to claim 9.

12. An optical reader, comprising the optical system according to claim 9.

13. An optical communication system, comprising the optical system according to claim 9.

14. An opto-electronic system, comprising the optical system according to claim 9.

15. An integrated optical circuit, comprising the optical system according to claim 9.

16. A microscopy system, comprising the optical system according to claim 9.

17. A virtual reality system, comprising the optical system according to claim 9.

18. An augmented reality system, comprising optical the system according to claim 9.

19. A method, comprising passing a light beam through the optical system according to claim 9 to form a hologram.

20. An optical system, comprising a partially reflective partially transmissive element and the optical element according to claim 1 placed in front of a reflective side of said partially reflective partially transmissive element.

21. An optical system, comprising:
a multilayer optical element having a plurality of layers arranged along an optical axis, each layer having a plurality of nanostructures, wherein a size of—and a spacing between—said nanostructures is selected to provide a resonant response to an optical field at a different wavelength; and
a non-resonant optical element;
wherein a distance between each of said layers and said non-resonant optical element is about an integer multiplication of a quarter wavelength of a respective wavelength for which said layer provides said resonant response.

22. A method of fabricating multilayer optical element, the method comprising:
forming on a substrate a plurality of nanostructures, wherein a size of—and a spacing between—said nanostructures is selected to provide a resonant response to a polychromatic optical field at a predetermined wavelength, thereby providing a first layer;
growing an additional substrate on said first layer; and
repeating said formation of nanostructures on said additional substrate for a different predetermined wavelength, thereby providing a second layer;
wherein a distance between said layers is selected to induce destructive or constructive interference of components of said polychromatic optical field within a spectral crosstalk among said resonant responses, said spectral crosstalk being defined as an overlap between curves describing interaction amplitudes of said polychromatic optical field with said nanostructures of respective layers.

23. The method according to claim 22, further comprising repeating said growing and said formation at least once, to form at least one additional layer.

24. The method according to claim 22, wherein for each layer, a standard deviation of a size of said nanostructures is less than 20% of an average size of said nanostructures.

25. The method according to claim 22, wherein each layer comprises nanostructures made of a different metal.

26. The method according to claim 25, wherein said plurality of layers comprises a first layer having gold nanostructures sized and spaced apart to provide a resonant response to an optical field at a first wavelength, a second layer having silver nanostructures sized and spaced apart to provide a resonant response to an optical field at a second wavelength being shorter than said first wavelength, and a third layer having aluminum nanostructures sized and spaced apart to provide a resonant response to an optical field at a third wavelength being shorter than said second wavelength.

27. The method according to claim 22, wherein for each layer, said nanostructures are arranged to form a zone plate.

28. The method according to claim 22, wherein said nanostructures of said layers are arranged to focus said different wavelengths onto the same focal plane.

29. The method according to claim 22, wherein nanostructures of one of said layers are arranged to focus a respective wavelength to a spot at a focal plane, and nanostructures of another one of said layers are arranged to focus a respective wavelength to an annulus surrounding said spot at said focal plane.

* * * * *